US012657173B2

(12) United States Patent
Hladik

(10) Patent No.: US 12,657,173 B2
(45) Date of Patent: Jun. 16, 2026

(54) DATA PROCESSING USING VERSIONED PROCESSING ELEMENTS

(71) Applicant: SAP SE, Walldorf (DE)

(72) Inventor: Michael Hladik, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/975,924

(22) Filed: Dec. 10, 2024

(65) Prior Publication Data

US 2026/0161623 A1     Jun. 11, 2026

(51) Int. Cl.
  *G06F 16/00*        (2019.01)
  *G06F 16/21*        (2019.01)
  *G06F 16/23*        (2019.01)
(52) U.S. Cl.
  CPC ........ *G06F 16/219* (2019.01); *G06F 16/2358* (2019.01)
(58) Field of Classification Search
  None
  See application file for complete search history.

(56) References Cited

U.S. PATENT DOCUMENTS

| | | | | |
|---|---|---|---|---|
| 9,552,239 | B2 * | 1/2017 | Kumar | G06F 9/547 |
| 10,157,194 | B1 * | 12/2018 | Cole | G06F 16/1815 |
| 11,150,892 | B2 * | 10/2021 | Kesavan | G06F 8/71 |
| 11,907,184 | B1 * | 2/2024 | Simonelic, II | G06F 16/25 |
| 11,922,326 | B2 * | 3/2024 | Wellman | G06F 40/40 |
| 2007/0299858 | A1 * | 12/2007 | Norcott | G06F 16/211 |
| | | | | 707/999.102 |

| | | | | |
|---|---|---|---|---|
| 2009/0313608 | A1 * | 12/2009 | Sharma | G06F 16/213 |
| | | | | 707/999.203 |
| 2010/0076931 | A1 * | 3/2010 | Bornhoevd | G06F 16/219 |
| | | | | 707/638 |
| 2014/0365811 | A1 * | 12/2014 | Veiga | G06F 11/2041 |
| | | | | 714/4.11 |
| 2015/0046902 | A1 * | 2/2015 | Kumar | G06F 9/4484 |
| | | | | 717/114 |
| 2015/0046905 | A1 * | 2/2015 | Kumar | G06F 8/36 |
| | | | | 717/122 |
| 2015/0363452 | A1 * | 12/2015 | Tu | G06F 16/2329 |
| | | | | 707/638 |
| 2016/0292192 | A1 * | 10/2016 | Bhagat | G06F 16/258 |

(Continued)

FOREIGN PATENT DOCUMENTS

| | | | | |
|---|---|---|---|---|
| CN | 115168445 | A * 10/2022 | ......... | G06F 16/2358 |
| EP | 3062287 | 8/2016 | | |

OTHER PUBLICATIONS

Extended European Search Report received in European Application No. 25206838.2 dated Mar. 9, 2026, 13 pages.

*Primary Examiner* — Jean M Corrielus
(74) *Attorney, Agent, or Firm* — Klarquist Sparkman, LLP

(57)     ABSTRACT

Techniques and solutions are disclosed for managing subprocess versions and their associated components in a computing system. These techniques enable dynamic adaptation and traceability through version control. A subprocess definition is received and updated to reflect modifications to its components, configurations, or execution sequence. Changes are identified and propagated using unique version identifiers and events. Iterative refinement is supported through actions such as validating updated subprocesses, reprocessing data, or maintaining provenance chains. The disclosed solutions provide efficient and structured management of subprocesses.

20 Claims, 29 Drawing Sheets

(56)                    References Cited

U.S. PATENT DOCUMENTS

| | | | |
|---|---|---|---|
| 2016/0350107 A1 | 12/2016 | Bragg, Jr. et al. | |
| 2017/0357648 A1* | 12/2017 | Fink | G06F 16/1873 |
| 2018/0018370 A1* | 1/2018 | Feiks | G06F 16/2365 |
| 2018/0329782 A1* | 11/2018 | Kludy | G06F 11/3006 |
| 2018/0341651 A1* | 11/2018 | Fink | G06F 16/1873 |
| 2018/0341667 A1* | 11/2018 | Gluzman Peregrine | |
| | | | G06F 16/219 |
| 2019/0121792 A1* | 4/2019 | Cole | G06F 16/1815 |
| 2020/0012738 A1* | 1/2020 | Tung | G06F 16/9024 |
| 2021/0034357 A1* | 2/2021 | Kesavan | G06F 11/1433 |
| 2021/0182038 A1 | 6/2021 | Isman et al. | |
| 2021/0182247 A1 | 6/2021 | Fuksbrumer et al. | |
| 2022/0309045 A1* | 9/2022 | Lambert | G06F 16/213 |
| 2023/0068340 A1* | 3/2023 | Wellman | G06F 40/279 |
| 2023/0072825 A1* | 3/2023 | Lambert | G06F 16/213 |
| 2023/0147631 A1* | 5/2023 | Brunzema | G06F 11/3051 |
| | | | 717/168 |
| 2023/0153826 A1 | 5/2023 | Srivastava et al. | |
| 2023/0267103 A1* | 8/2023 | Lambert | G06F 16/213 |
| | | | 707/803 |

* cited by examiner

FIG. 3

| Subprocess Source 310a | ExternalDataToSourceData 310b | SourceDataToSourceScehma 310c | SourceSchemaToPipeline 310d | PipelineToSubGraph 310e | SubGraphToDerivative 310f |
|---|---|---|---|---|---|
| SAP Enterprise Architecture Framework | Component in:<br>• ExternalData<br>• SourceData Extractor<br>Component out:<br>• SourceData | Component in:<br>• SourceData<br>• SourceSchemaGenerator<br>Component out:<br>• SourceSchema | Component in:<br>• SourceSchema<br>• SubOntologyGenerator<br>• PipelineGenerator<br>Component out:<br>• SubOntology<br>• Pipeline | Component in:<br>• SourceData<br>• Pipeline<br>• Graphwriter<br>• SubOntology<br>Component out:<br>• SubGraph | Component in:<br>• SubGraph(Source)<br>• SubGraph(Target(s))<br>• DerivativeWriter<br>Component out:<br>• DerivativeData |

300

320

600

618
<<Core>>
Source

+ Identifier   : Character
+ Name       : Character
+ Code        : Character
+ Description: String

626
<<Core>>
SubprocessComponent
{abstract}

+ Identifier   : Character
+ Name        : Character
+ Description : String

614
<<Core>>
Process

+ Identifier    : Character
+ Name        : Character
+ Description : String

622
<<Core>>
Subprocess

+ Identifier    : Character
+ Name        : Character
+ Description : String

630
<<Core>>
Component
{abstract}

+ Identifier    : Character
+ Name        : Character
+ Description : String

610
<<Core>>
Model

+ Identifier    : Character
+ Name        : Character
+ Code         : Character
+ Description : String

Model
Source
Process
Component
Subprocess
Subprocess Component assign..

| Component Version | Signavio Process Database |
|---|---|

Component Name

Extract SEAF Data

Source    SEAF

Category    Data artifact

Type    ED

Component Versions

| Version | Description | Date | Time | Status |
|---|---|---|---|---|
| 0.0.0 | Initial version | 28.08.24 | 13:25:44 | Initial |
| 1.0.0 | First released version | 1.9.24 | 15:33:22 | Active |
| 1.0.1 | First patch | 7.9.24 | 09:10:12 | Discarded |
| 1.0.2 | Second patch | 8.9.24 | 10:12:23 | Active |
| 1.1.0 | New feature | 16.9.24 | 12:11:55 | Alpha ▽ |
| | | | | |

FIG. 17

2200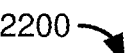

Receive a definition of a first version of a subprocess, the first version of the subprocess including one or more components, the one or more components being associated with a respective executable implementation          2210

Process data using the first version of the subprocess to produce first results          2214

Receive a change to the definition of the first version of the subprocess to provide a second version of the subprocess, the change being a change to a version of a component of the first version of the subprocess or a change to the components, or sequence in which components are called, of the first version of the subprocess          2218

Generate an identifier of the second version of the subprocess          2222

Generate an event indicating the first version of the subprocess has been updated          2226

In response to generating the event, (1) trigger a request to validate the second version of the subprocess or validate ed  results generated by the second version of the subprocess, or (2) reprocess the data using the second version of the subprocess, or (3) add the identifier of the second version of the subprocess to a provenance chain that includes version identifiers for multiple subprocesses of a process, the multiple subprocesses comprising the process          2230

DATA PROCESSING USING VERSIONED PROCESSING ELEMENTS

FIELD

The present disclosure generally relates to versioning in data processing workflows.

BACKGROUND

In contemporary data management and analysis, knowledge graphs serve as foundational frameworks for organizing, representing, and integrating structured knowledge from diverse sources. Knowledge graphs encode information in a graph-based format, with nodes representing entities and edges denoting relationships. This interconnected structure facilitates advanced analytics, natural language processing (NLP), and artificial intelligence (AI) applications.

The processes used to ingest and transform data prior to its integration into a knowledge graph or schema can significantly impact subsequent applications, such as training neural language models. However, data ingestion pipelines are often ad hoc, making it difficult to track the specific operations performed, particularly when pipeline components or their configurations change over time. This lack of traceability complicates determining whether datasets were processed consistently or if previously processed data requires reprocessing due to changes in pipeline versions. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are disclosed for managing subprocess versions and their associated components in a computing system. These techniques enable dynamic adaptation and traceability through version control. A subprocess definition is received and updated to reflect modifications to its components, configurations, or execution sequence. Changes are identified and propagated using unique version identifiers and events. Iterative refinement is supported through actions such as validating updated subprocesses, reprocessing data, or maintaining provenance chains. The disclosed solutions provide efficient and structured management of subprocesses.

In one aspect, the present disclosure provides a process for managing subprocess versions and associated updates within a computing system. A definition of a first version of a subprocess is received. The first version of the subprocess includes one or more components, where the one or more components are associated with a respective executable implementation. Processing data using the first version of the subprocess to produce first results occurs.

A change to the definition of the first version of the subprocess is received to provide a second version of the subprocess. The change involves either a version of a component of the first version of the subprocess or the components themselves, or the sequence in which the components are called, of the first version of the subprocess. An identifier of the second version of the subprocess is generated.

An event is generated indicating that the first version of the subprocess has been updated. One or more actions are performed in response to the event. These actions include triggering a request to validate the second version of the subprocess or the second results, reprocessing the data using the second version of the subprocess, or adding the identifier of the second version of the subprocess to a provenance chain. The provenance chain includes version identifiers for multiple subprocesses of a process, where the multiple subprocesses include the process.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 describes example input and output components that can be used with the subprocesses of FIG. 2.

FIG. 6 is a schema, such as a core schema, illustrating relationships between various data artifacts of the schema, including a model, a process performed using the model, and components of the process.

FIG. 17 is an example user interface where a user can view version information for subprocess components.

FIG. 22 is a flowchart of a process of managing subprocess versions and associated updates within a computing system.

DETAILED DESCRIPTION

Example 1)—Overview

Continuing from the Background, the present disclosure provides techniques and solutions for identifying elements of a process, using the particular example of an ingestion pipeline for data that can be used for training purposes, such as for training a neural language model. Identifying elements of the process provides a number of benefits, including enabling modification or reexecution of processes when an element is altered. For example, modifying an algorithm used for transforming data can be used to generate an updated process that uses the modified algorithm in place of the original algorithm, or to notify a user, such as a developer, of the new algorithm version, allowing them to determine whether a process should be updated to use the new algorithm.

As for reexecution, it may be desirable to have data to be used for a common purpose processed consistently to make training as accurate as possible. Thus, if new data will be processed by an updated algorithm, it may be useful to reprocess existing data using the updated algorithm.

Defining standard types of process elements for making process more directly comparable and for automating actions in response to changes in process elements. For example, events can be raised when particular actions occur. These actions can include those described above, such as an event being raised when a process element changes, where the event triggers processing using the updated process element. Events can also trigger actions that cause users to be alerted to processing actions. For example, if data is processed using an updated version of an algorithm, an event can be raised that triggers an action for a user to review the results of the processing and determine if the results are suitable for further processing.

Information about processes used to process data can be added to, or otherwise associated with data sets resulting from the processing. This can facilitate comparing data sets, such as to understand where differences might arise. Such annotations can also be used to trigger reprocessing of data, as previously described.

Figure 1A:
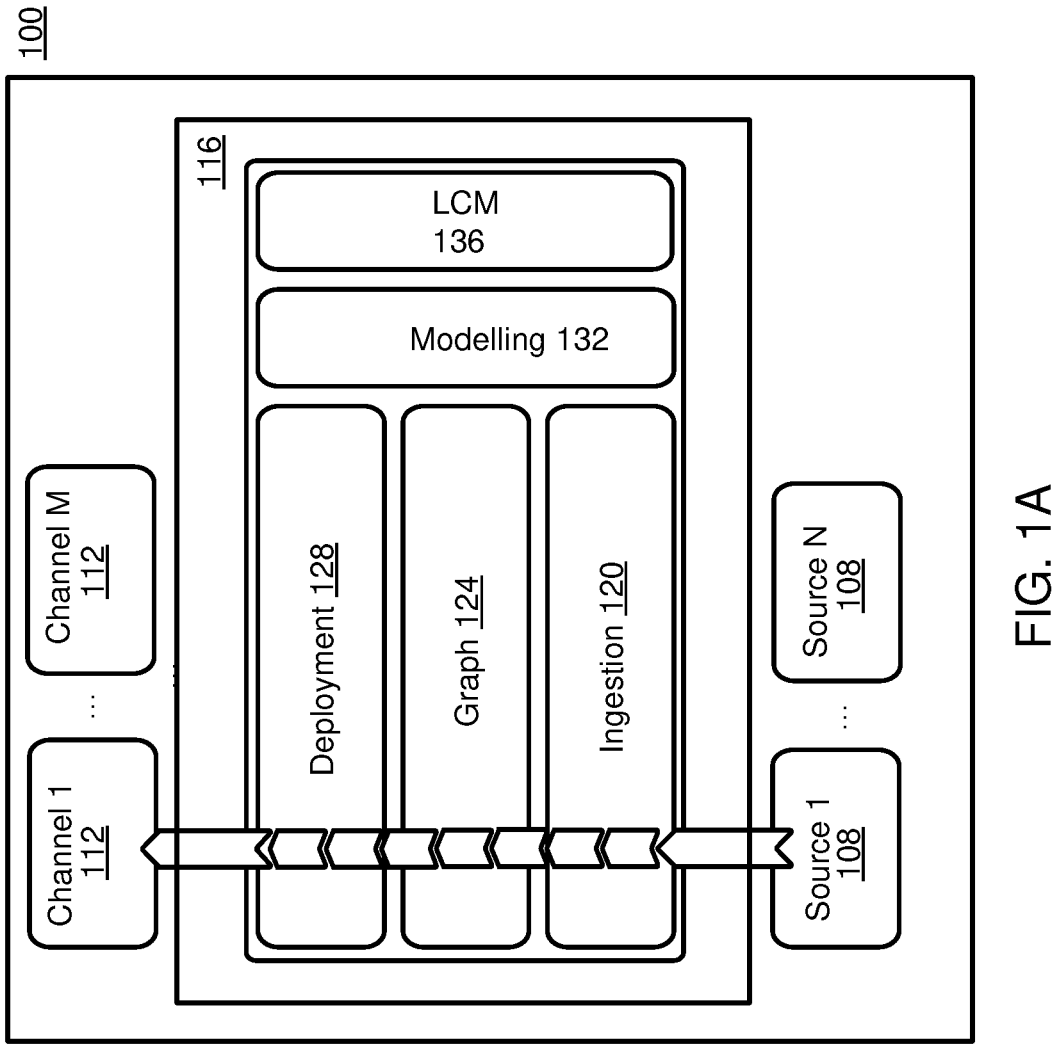
FIG. 1A illustrates an example computing environment for implementing disclosed techniques, including a processing framework configured to process data from one or more sources and provide processed data to one or more channels.

Example 2)—Example Ingestion of Data from Sources into a Graph and Deployment of Graph Data to Channels FIG. 1A illustrates a computing environment 100 that can be used in a particular implementation of disclosed techniques. In particular, the computing environment 100 facilitates a process of ingesting data from sources 108 to channels 112. A source 108 refers to an origin or provider of data, which can include databases, file systems, APIs, streaming services, or any other system or repository that produces or stores data for processing. Each source 108 can be associated with specific schemas, formats, or semantic models, and may provide structured, semi-structured, or unstructured data. Sources 108 in FIG. 1 represent these origins of data that are ingested into the system for subsequent processing and utilization in one or more channels 112.

A channel 112 refers to a target or endpoint where processed data is delivered or used. Channels 112 can represent systems, applications, services, or workflows that consume ingested data to perform specific tasks, such as analytics, visualization, machine learning, or decision-making. Each channel 112 may require data in a particular format or schema, and may integrate with multiple data sources. Channels 112 in FIG. 1 represent these destinations for processed data, which can leverage one or more sources 108 to fulfill their operational needs.

The sources 108 and channels 112 can have a N . . . M relationship. In other words, a given channel 112 can use data from one or more data sources 108. Data from a given data source 108 can be used with multiple channels.

A processing framework 116 is shown that processes data from one or more sources 108 and provides the data to one or more channels. Generally, the processing framework 116 includes an ingestion process 120 that ingests data from a source 108 and stores the data in a particular representation. In a specific example, the representation is a graph 124, such as a knowledge graph. The graph 124 can be associated with a schema, such as semantic schema, as will be further described.

The schema of the graph 124 is referred to as a local schema. Data from a source 108 is typically associated with a source schema, where such associating can be part of the ingestion process 120. In some cases, rather than converting data from the source schema to the local schema, the data is instead mapped from the source schema to the local schema, such as through annotations to the data. The data in the source schema can be referred to as a subgraph. Elements of the subgraph, such as semantic elements of the subgraph schema and instances of those elements, that are mapped to the local schema can be referred to as "derivatives" of elements of the local schema. In a particular example, a derivative relationship can be a predicate type in a knowledge graph, where the linked data corresponds to a subject and an object related by the predicate.

The ingestion process 120 can include operations such as data formatting and data cleansing. The ingestion process 120 can also include operations such as associating data with elements of the graph. Ingested data can, for example, be linked to particular components of a knowledge graph, including using an ontology defined for the knowledge graph. That is, a particular set of data can be annotated as being an instance of a particular class of the knowledge graph, and values in the set of data can be assigned to various properties defined for the class.

Deployment processes 128 can be defined for processing data to be provided to one or more channels 112. The deployment processes 128 can include operations such as extracting or transforming data from a format of the graph 124 to a format used by the channel. Deployment process 128 also include operations to send the data, optionally with any formatting or transformation, to a channel 112, such as a data store used by the channel.

A modelling component 132 can be used to perform operations such as associating data from a source 108 with a particular schema, such as a schema for the graph 124. A lifecycle management component 136 can be used to maintain version information for processing components, as well as data produced during processing. For example, processed data can be tagged with version information for a process or process elements used in its production. The lifecycle management component 132, in some cases, can perform actions related to version changes, such as raising event or triggering actions in response to a raised event.

The computing environment 100 can be referred to as a semantic data layer. Semantic data refers to data being not just raw values, but data that is associated with information (such as metadata) that describes what the data represents. For example, the graph 124 can store data values from a source 108, as well as information linking that data to elements of a knowledge graph. The semantic information can facilitate downstream use cases for the data, such as where training of a neural language model is more effective if training data includes not just the data but the semantic context of the data.

Figure 1B:
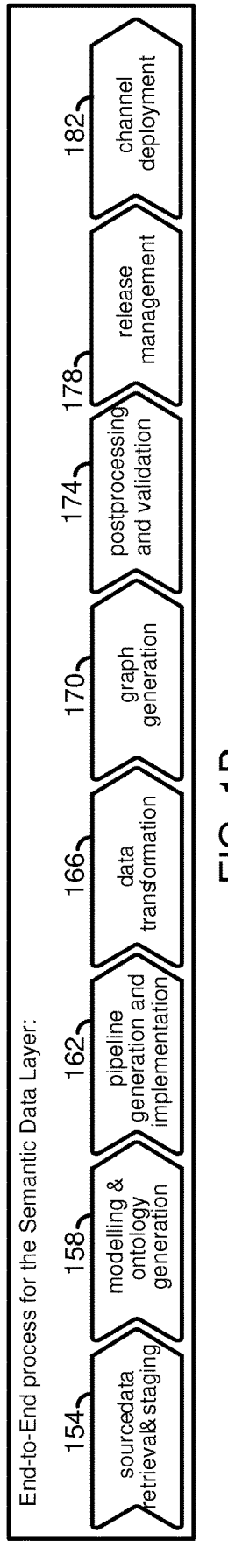
FIG. 1B illustrates example operations for defining a process to ingest data from one or more sources and deploy processed data to one or more channels, such as in the computing environment of FIG. 1A.

FIG. 1B outlines operations 150 for defining a process to ingest data from sources 108 and deploy it to channels 112 of FIG. 1A. For example, at 154, processes are defined that can be executed to obtain data from a source 108 and stage the data for further processing. Defining processes to ingest data can include defining software functionality for extracting information from repositories, databases, files, or through application programming interfaces (APIs). The operations at 154 can include identifying where data from the source 108 will be stored prior to further processing as well as processing for cleaning or organizing source data.

Modelling and ontology generation processes are defined at 158. Operations at 158 can include operations to define how an ontology or knowledge graph is to be constructed. The operations at 158 can also include defining process for how incoming data from a source 108 will be linked to a particular schema, such as a particular knowledge graph, which may have an associated ontology.

Operations at 162 include defining pipelines for processing data, including implementing various functionality to be performed as part of a pipeline. Pipeline operations can include operations to clean, transform, or integrate data. For example, a pipeline can be responsible for converting source data to a standardized format. The pipelines define operations at a general level, while specific operations, including data transformations, can be performed at 166.

Operations to generate a graph 124 are defined at 170. Operations to generate a graph 124 can include program logic for ingesting the transformed data into a graph, such as processes for creating nodes and edges that represent entities and their relationships. In particular implementations, graph generation operations can define how RDF (Resource Description Framework) triples will be generated to represent the ingested data in the graph 124, or a schema linked to the graph.

Operations are specified at 174 for reviewing and validating the graph 124 to confirm that it accurately represents the data and relationships. The operations can include defining, such as by domain experts, automated validation checks and manual review processes. Processes can be defined for correcting any errors or inconsistencies encountered during validation operations.

At 178, operations are defined for versioning data and managing releases of processed data. These operations can be used to provide the correct version of the graph 124 to users and applications (including as channels 112). Processes can be defined to document and manage updates or changes to the graph 124.

At 182, platforms and applications where the graph 124 will be deployed can be defined, as well as operations that define how data from the graph will be provided to a channel 112. For example, operations can be defined for deploying a knowledge graph to web applications, APIs, data analytics platforms, and other channels 112 where users or computing processing can interact with the data.

Note that the computing environment 100, particularly the processing framework 116, can be a reuseable component. For example, standard processes, subprocesses, and their components can be defined at a more general level. For particular data ingestion processes, elements of these standard processes can be linked, and the standard processes can be associated with particular implementations of the process. The particular implementations can also be reusable. The same data transformation operations, for example, can be performed in processing data from two different sources. That is, for example, a specific implementation of a process element can be used so long as the input is comparable with the implementation and the output is suitable for downstream processing.

Example 3)—Example Subprocesses in a Source to Graph Process

An overall process can be broken down into different elements, where the elements can be reused between different processes. Sources and subprocesses are two mechanisms for separating process elements into logical units. For example, an overall process of generating a graph from source data can progress in different phases, which can be referred to as subprocesses. Subprocesses can serve as synchronization points or points at which events can be raised, and actions taken. Synchronization points themselves can be a type of event/action. For example, synchronization can include determining that a subprocess has completed and notifying a user of the completion. The user can then determine whether the results of executing the subprocess indicate that further processing can be performed. Validation actions can themselves be events that can trigger further actions, such as proceeding to a next subprocess of an overall process.

In a source to graph process, an overall source to graph process can be defined at the granularity of a source. That is, assuming it is desired to ingest data from multiple sources, separate source to graph process are defined for each source. Although the processes are defined separately, the processes can have the same general elements, or even particular implementations of such elements. Among other things, having different processes for different sources allows processes to be performed asynchronously. For example, data sources can be updated at different frequencies, and having separate processes can allow updated data from one source to be processed even if another source does not have updated data.

While the term "source" embraces many different types of sources, specific examples of sources that can be used with a source to graph process include SAP Enterprise Architecture Framework (SEAF), SAP Enterprise Architecture Reference Library (SEARL), and American Productivity and Quality Center (APQC). These sources define local schemas from both a technical level and a semantic perspective. That is, for example, a technical format may be that data is stored in a relational format, whereas the semantic perspective can include linking the data to a semantic description, such as an ontology or storing data in a knowledge graph. These data sources typically require at least some differences in implementing subprocesses and subprocess components, such as to extract, transform, and store content in a graph format. In some cases, multiple sources can have their data extracted into a common graph, or at least different graphs mapped to a common format, such as a local schema. However, the release cycles for the sources can differ, and the asynchronous nature of the processes for the sources allows data to be processed separately for each source, where results are synchronized with the common graph.

Figure 2:
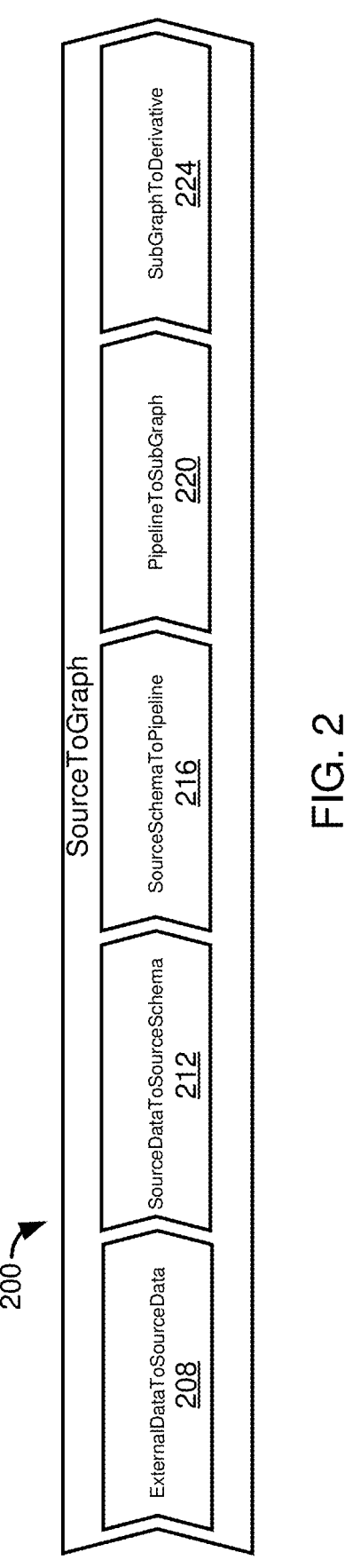
FIG. 2 is a diagram illustrating subprocesses for a process of ingesting data from a source into a graph.

FIG. 2 illustrates an overall source to graph process 200. The process 200 includes a number of subprocesses. An external data to source data subprocess 208 is responsible for obtaining and staging source data for further processing. A source data to source schema process 212 is responsible for mapping the source data to a particular schema defined for the source data. A source schema to pipeline subprocess 216 takes the source data, now integrated with the source schema, into a processing pipeline that can include operations to clean, format, or transform source data. A pipeline to subgraph subprocess 220 takes data from the pipelines and adds the data to a subgraph graph, which can be a subgraph of the graph 124 of FIG. 1. A subgraph to derivative data subprocess 224 analyzes data in the subgraph and relates it to the local schema of the graph 124 of FIG. 1.

The subprocesses 208-224 can represent general operations that are performed during a source to graph process 200. These subprocesses 208-224 can be associated with implementations that are associated with a particular source. In a sense, the subprocesses 208-220 can be thought of as base classes in a computing language such as C++, where implementations specific for a given source correspond to derived classes of the base class.

As discussed in Example 1, elements of a process, such as the subprocesses 208-224 can change over time. Subprocesses 208-224 can be associated with version information, which provides a time dependency for data resulting from a subprocess. For example, data produced by a subprocess can be associated with a version identifier of the subprocess. Thus, data can be associated with an identifier that can be used to determine exactly how data was processed during the subprocess.

Versioning of subprocesses can be related to versioning of components used in a subprocess. A subprocess may have an input component, a processing component, and an output component, or can use multiple of these types of components. A change to one of these components can result in a new version of a subprocess. Thus, it can be precisely identified how particular data in a data set, such as a subgraph, was produced. This information can be used in various ways, including when determining whether data should be reprocessed to account for changes in a subprocess of the process used to ingest the data initially.

FIG. 3 illustrates how the implementation of a subprocess can be defined from elements, referred to as components. As with the subprocess themselves, components of a subprocess can represent general data artifacts usable in defining subprocesses, as well having implementations for specific subprocesses of a specific process. A data artifact refers to any representation of data within a computing system, including both abstract definitions and concrete instances of data. Abstract definitions can include schema elements, models, classes, or templates that define the structure, relationships, semantics, or associated operations of data, such as methods or functions that can be performed on instances of the artifact. Concrete instances can include individual data points, records, objects, or entities that conform to or are derived from these definitions. A data artifact may represent static or dynamic data and can exist in various forms, including structured, semi-structured, or unstructured data. It can also include metadata or annotations associated with data, such as information describing its provenance, relationships, or intended use, as well as operations or behaviors tied to the artifact's purpose or role within a system.

In particular, FIG. 3 provides a table 300 that includes columns 310b-310f for specific subprocesses of a source to graph process for a source indicated in column 310a. In row 320, where SAP Enterprise Architecture Framework is used as the source, the external data-to-source data subprocess 310b can have input components of external data and a source data extractor. The output of the subprocess 310b is source data. Note that in addition to having input components and output components, components can have different natures, in the sense of being data (including as represented in a data artifact), input or output, or processing (also referred to as algorithms). While subprocesses for different sources can have the same general components, the implementations of the components can differ as needed given the nature of the source data.

The subprocesses of columns 310c-310f are generally similar to the subprocess of column 310b, in that they have input and output components, where the components can be data artifacts or algorithms. The source data-to-source schema subprocess of column 310c includes input components of source data and a source schema generator algorithm. The output is a source schema.

The source schema-to-pipeline subprocess of column 310d has input components of a source schema, and input algorithmic components of a SubOntologyGenerator and a Pipeline generator. The output components are a subontology and a pipeline.

The pipeline to subgraph subprocess of column 310e has input components of the source data (such as produced by the external data to source data subprocess of column 310a) and a pipeline produced by the subprocess of column 310d. The input components of the subprocess of column 310d further include a graph writer that writes data to the graph and a subontology that is used by the graph writer. The pipeline-to-subgraph subprocess outputs a subgraph.

Column 310f represents a subgraph to derivative subprocess that links data in a graph to data in another graph, such as a local graph. The subgraph-to-derivative subprocess has input components of a subgraph from a source and a subgraph of a target, where it attempts to match data of the source to data (or semantic elements) of the target, such as using respective schemas of the source and target. An input component of a derivative writer operates on the subgraphs, and produces an output component of derivative data, which annotations link data between the processed data set in a source schema and a local schema.

Figure 4A:
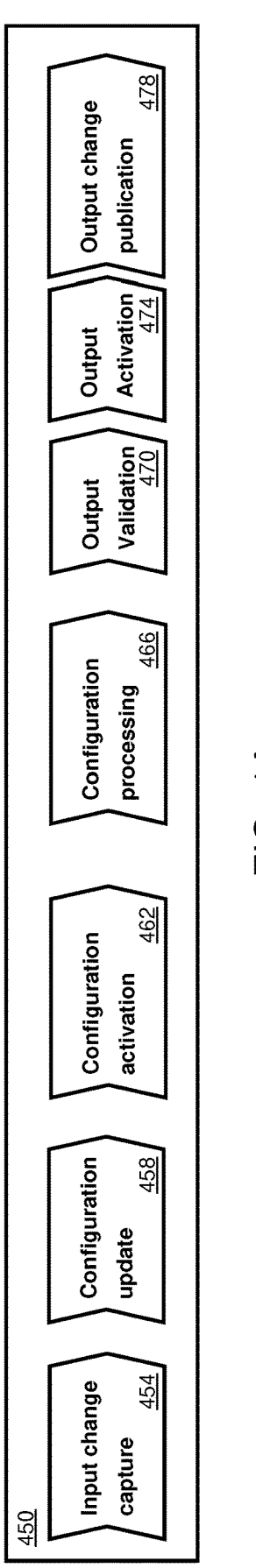
FIG. 4A illustrates a computing environment and runtime for lifecycle management of processes and process elements, including subprocesses and components.

Example 4)—Example Conversions of Inputs to Outputs Using Subprocess Configuration FIG. 4A illustrates a computing environment and runtime 410, where processes and their subprocesses and components are executed. An example subprocess 414 has a configuration 418, where the configuration includes components, shown as components 422a, 422b. Components 422a are data artifacts that correspond to a particular data type or data structure that stores data. Examples of data artifacts include relational database tables, RDF triples, and JSON objects. Components 422b are algorithms, such as algorithms that process data from one or more components 422a and produce one or more outputs that can also be components 422.

As shown, the components 422a, 422b are arranged sequentially, where a data artifact component 422a is provided as input to an algorithm component 422b, producing an output data artifact component 422a, which in turn can be input to further algorithm components 422b. A subprocess can have one or more final output data artifact components 422a, which can serve as final outputs of an overall process or can serve as inputs for a subsequent subprocess.

One or more inputs 430 can be provided to the subprocess 414, such as data artifacts that are outputs of a preceding subprocess. These inputs 430 can thus serve as input data artifact components 422a. Similarly, a final output data artifact component 422a can be an overall output 434 of the subprocess 414, which can then be provided as input to a subsequent subprocess.

Inputs 430 and outputs 434 can be associated with particular events, and particular actions can be triggered based on a particular event. For example, the availability of a new input 430 can trigger the execution of subsequent subprocesses that operate on the input. An output 434 can be associated with events such as alerting a user to the availability of new data. A user can choose to activate the output 434, such as if it passes quality checks, which then serves as an input to downstream subprocesses. While in some cases manual validation of outputs 434 is used, in other cases validation can be skipped or validations can be performed in an automated manner. When automated, successfully passing validations can cause an output 434 to be made available as an input to a downstream process.

Figure 4B:
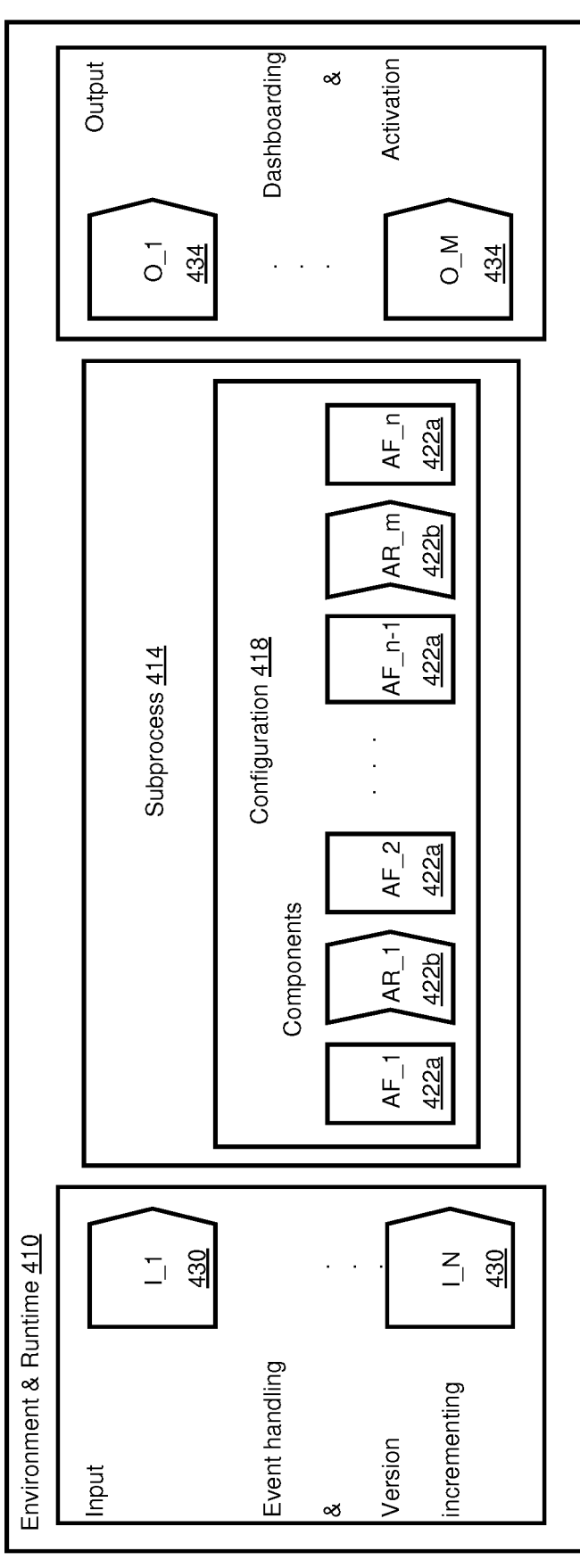
FIG. 4B illustrates a process for lifecycle management of processes and process elements, including subprocesses and components, that can be executed in the computing environment and runtime of FIG. 4A.

FIG. 4B illustrates a process 450 that can be executed in the computing environment and runtime 410 of FIG. 4A if a subprocess is modified, or if new or altered input data becomes available. At 454, a change to an input is captured. The change to an input can include new input data being available, which can include previously processed data that has been modified, such as being processed by an updated subprocess than was previously used in providing the input.

At 458 a change to a subprocess configuration is received. The change to a subprocess can include adding, removing, or reorganizing components 422a, 422b. The change to a subprocess can also include changing a definition or format of a data artifact component 422a, or changing the algorithm used in an algorithm component 422b. If the configuration update is received, the update can be applied and then the updated configuration activated at 462.

When input is to be processed by the subprocess 414, the subprocess can be executed at 466. Output of the subprocess can be validated at 470, where if the output is validated, the output can be activated, making it available for use by downstream subprocesses, at 474. An output change notification can be published at 478. The output change notification can alert subprocess that use the output of the subprocess 414 that new data is available to be processed.

Note that all or a portion of the operations of the process 450 can be performed. That is, in some cases an update to the configuration 418 of the subprocess 414 can be received without new data being available to be processed. In this case, operations at 458 and 462 are performed, but not other operations. Similarly, new input can be made available for processing in the absence of a change to the configuration 418 of the subprocess 414. In this case, operations 454 and 466-478 are performed, but not operations 458 and 462.

As previously described, inputs and outputs of subprocesses can be associated with version information that specifies what version of a subprocess, and therefore its components, was used in producing a particular output. When data is processed using the subprocess 414, incremented versions of previously produced output data artifact components 422a can be produced. This allows the outputs of different subprocess versions to be identified. Version information can be carried between subprocesses, such that an incremented version of an output that serves as input to a subsequent process in turn produces an incremented version of the output of the subsequent process.

A variety of mechanisms can be used to track version information. In a particular example, semantic versioning can be used when a subprocess or subprocess component is updated. A version number can be specified as MAJOR.MINOR.PATCH, where a MAJOR version is associated with incompatible API changes, a MINOR version is associated with added functionality that is backwards compatible, and a PATCH version involves backwards compatible bug fixes. This notation can be extended, such as by having extensions for pre-release and build metadata. For example, a version that has not been activated can be designated as an alpha version.

In some cases, multiple components of a subprocess can change as part of a single update. In this case, the version information for the subprocess can be determined by aggregating the changes at the component level. For example, if one component is updated to a new minor version and another component is updated to a new patch version, both the minor version and the patch version of the subprocess are updated. In some cases, changes to multiple components can result in multiple instances of the same type of version update being performed, such as if two components are subject to minor version updates. In this case, rather than incrementing the version identifier of the subprocess by a single minor version, it is incremented twice.

Figure 5:
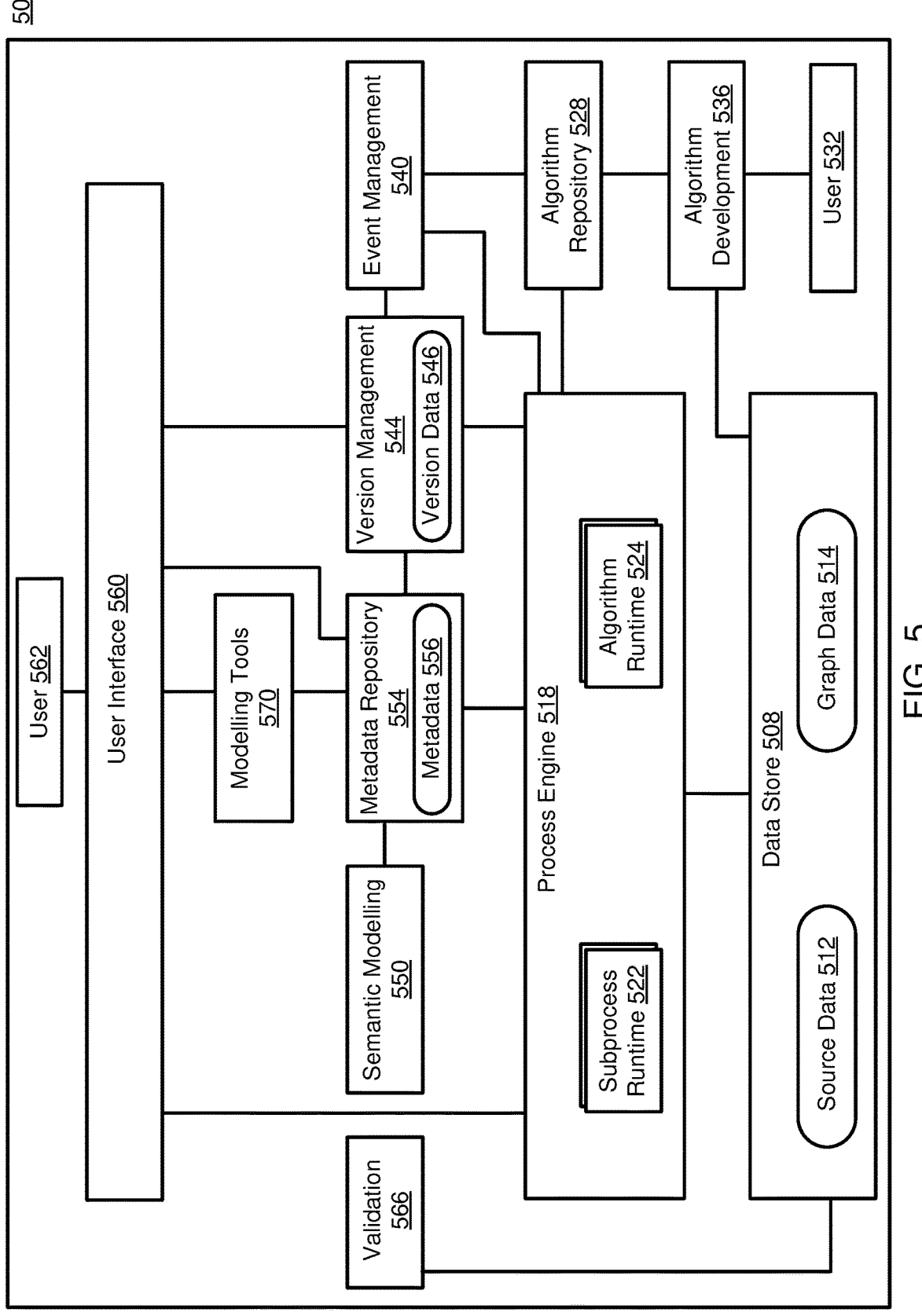
FIG. 5 is a diagram illustrating an example computing environment in which disclosed techniques can be implemented.

Example 5)—Example Computing Environment for Defining and Executing Processes FIG. 5 is a diagram of a computing environment 500 in which disclosed techniques can be implemented. A data store 508, such as a relational database or an object store, can store source data 512 and graph data 514. The source data 512 can be data that was retrieved from an external source, such as a source 108 of FIG. 1. The graph data 514 can correspond to data of the graph 124, or, in cases where data is not directly stored in a local graph, the graph data can be stored in a separate graph where, at least after processing, the graph data can be mapped to a local graph. Graph data 514 can be stored in a manner that directly reflects the structure of the graph, or in a manner that may not directly reflect the structure of the graph, but can be used to construct the graph and obtain its structural details. For example, data can be stored as nodes and edges, or, for a knowledge graph, the graph data 514 can correspond to RDF triples.

A process engine 518 can read information from, and write information to, the data store 508. For example, a subprocess can read source data 512 or graph data 514, or can write updated source data or graph data, such as after performing operations defined by the components of the subprocess. The process engine 518 includes one or more subprocess runtimes 522 and one or more algorithm runtimes 524, where an algorithm runtime can be called by the execution of a subprocess in a subprocess runtime.

As part of executing an algorithm in the algorithm runtime 524, the algorithm runtime can access algorithms in an algorithm repository 528. Accessing algorithms can include calling an algorithm for execution with a particular set of input data.

A user 532 can interact with an algorithm development component 536. In some cases, the algorithm development component 536 can be an Integrated Development Environment (IDE). The user 532 can cause new algorithms to be deployed to the algorithm repository 528, or can update versions of algorithms. The deployment of a new algorithm version is broadcasted through the event management 540. Typically, if new algorithms are deployed and a corresponding event is created, the user 532 also creates a subprocess, or modifies an existing subprocess, to use the new algorithm.

As previously explained, updates to algorithms, data artifact components, or subprocesses can be associated with version management information, including where a subgraph produced through a source to graph process can include identifiers for subprocesses used in processing data, or where intermediate data can include identifiers of subprocesses previously executed in producing the intermediate data. Accordingly, the algorithm repository 528 can notify an event management component 540 when a component or process is updated. In turn, the event management component 540 can raise an event with a version management component 544.

The version management component 544 can update version information for processes, subprocesses, or components, including storing the information in version data 546. The event management component 540 can generate additional events in response to version changes, either through an initial notification from the algorithm repository 528 or in response to a communication from the version management component 544. The event management component 540 can trigger other actions, such as triggering operations by the process engine 518. For example, an updated version of a subprocess being available can result in the event management component 540 generating a command to the process engine 518 to reprocess previously processed data using the updated subprocess.

A semantic modelling component 550 maintains schemas that provide semantic meaning to source data, such as knowledge graph or an ontology. A metadata repository 554 stores metadata 556, which can be used to maintain and provision parts of an overall process model, including provisioning the process engine 518 with definitions of subprocesses or subprocess components. That is, the metadata repository 554 can store process definitions, and cause code implementing the process definitions to be executed by the process engine 518.

A user interface 560 can allow a user 562 to access various components of the computing environment, including the semantic modelling component 550, the metadata repository 554, the version management component 544, and the event management component 540. The user interface 560 can allow the user to access a validation component 566. The validation component 566 can perform various actions. For example, the validation component 566 can provide the user interface 560 with information about the results of executing a subprocess, and in response the user can choose to validate or not validate the results. If the results are validated, the validation component 566 can communicate with the event management component 540, such as where the event management component notifies the process engine 518 that an output of one subprocess is approved for use with downstream subprocesses.

Various operations can be performed in the computing environment 500. A user 562 can, through the user interface 560, access the semantic modelling component 550 and define semantic models. Through the user interface 560, a user 562 can define sources, processes, subprocesses, and component, which can be stored in the metadata 556. If metadata 556 is changed for an existing source, process, subprocess, or component, messages can be sent to the event manager 540, which can take actions as have been previously described.

As described, a user 532 can access the algorithm development component 536 to define or modify algorithms for use in subprocesses. When an algorithm is activated for use, a communication can be sent to the event manager 540, which can trigger actions such as determining whether an update to an algorithm should result in reprocessing of data. Metadata 556 for an algorithm can also be changed, which can trigger an event of the event management component 540. For example, a change in a sequence in which an algorithm is called may affect metadata defining how the algorithm relates to other components, but the algorithm itself remains unchanged.

In modifying sources or processes defined for sources using the modelling tools 570, a user 562 can select to activate new or modified sources, processes, or process elements. In some cases, these new or modified elements can be processed automatically in response to other processes. For example, a putative new subprocess version may be defined automatically based on changes to a component of the subprocess, such as changing the definition of a data artifact component or the processing performed by an algorithm component. Before the new version of the subprocess is executed, at least in some cases, the new version of the subprocess is required to be activated by the user 562.

When a subprocesses is triggered for execution, it can be executed in the process engine 518, using the subprocess runtime 522 and the algorithm runtime 524. Execution of a subprocess produces one or more outputs, such as output data artifacts, which can be stored in the data store 508. The completion of the subprocess can raise an event with the event manager 540, such as where the event manager notifies a user 562 that new output data is available, so it can be approved by the user prior to that output data being provided as input to a downstream process. Information about the output can be stored in the version data 546, such as associating the result with an identifier of the subprocess used to produce the output.

Example 6)—Example Schemas for Models, Processes, and Process Elements

FIGS. 6-9 provide further details about how processes and their constituent elements can be represented and related. In this content, the term "model" refers to a description of the overall configuration, data, and process structures used to process and store source data in a graph. A model type provides a template for a process and expresses dependencies between processes, subprocesses, and components. Model types can be used to generate executable processes that use particular implementations of process elements specific to a particular source. Thus disclosed techniques provide a structured way of representing processes, which facilitates the reuse of subprocesses and components, as well as establishing a provenance chain that identifies how particular data was generated. In this context, a provenance chain is a record or lineage that traces the sequence of processes, subprocesses, components, and their respective versions involved in generating specific data. This allows the system to associate data outputs with the specific inputs, configurations, and processing steps, including the versions of those elements, enabling traceability, reproducibility, and accountability.

FIG. 6 provides a schema 600 that describes how a model can be related to model components. A definition 610 of a model data artifact is associated with a definition 614 of a process data artifact. In practice, a given model can be associated with multiple processes, while each process is associated with a single model. A process can also be nested within other processes, allowing for hierarchical relationships between processes.

The definition 610 of the model artifact is associated with a definition 618 of a source data artifact. A model can have multiple sources, but each source is associated with a single model. A source defines a particular process for retrieving specific data, such as identifying a location of a repository from which data will be retrieved, as well as methods, such as APIs, used to retrieve the data.

The definition 614 of the process data artifact is also related to the definition 618 of a source data artifact. In particular, a given process data artifact is associated with exactly one source, while each source can be associated with multiple processes.

The definition 614 of the process artifact is related to a definition 622 of a subprocess data artifact. A given subprocess can be related to one process, while a given process can be related to one or more subprocesses. The definition 622 of the subprocess data artifact is also related to the definition 618 of the source artifact. Specifically, each subprocess is associated with a single source, but a given source can be associated with multiple subprocesses.

The definition 622 of the subprocess data artifact is related to a definition 626 of a subprocess component data artifact. In particular, a subprocesses includes one or more subprocess components, while a given subprocess component is related to a single subprocess. Note that the definition 626 of the subprocess component data artifact is labelled as "abstract." In this case, a subprocess component serves as a template, where in use a class that implements the abstract subprocess component is defined, so that, for example, a common type of subprocess component can be associated with different implementations, such as those suitable for use with a particular subprocess or with a particular source.

The definition 626 of the subprocess component data artifact is related to a definition 630 of a component data artifact. A subprocess component can reference one component in a given role (input, processing, output), and a given component can be referenced by multiple subprocess components. Components can refer to, for example, types of data artifacts or algorithms, while a subprocess component refers to a component in the specific context of a particular subprocess, including its interactions with other subprocess components.

The definition 630 of the component data artifact is also related to the definition 618 of the source data artifact and the definition 614 of the model data artifact. Specifically, components are associated with a single model, while a given model can have one or more components. Each component is associated with a single source, but a given source can be associated with one or more components.

In implementation, the data artifact definitions shown in the schema 600 can be extended to include attributes beyond those shown, such as attributes that allow related instances of the data artifacts to be tracked. For instance, the definition 626 of the subprocess data artifact can include an attribute that serves as a foreign key to an identifier of a process in an instance of the definition 614 of the process data artifact.

Figure 7:
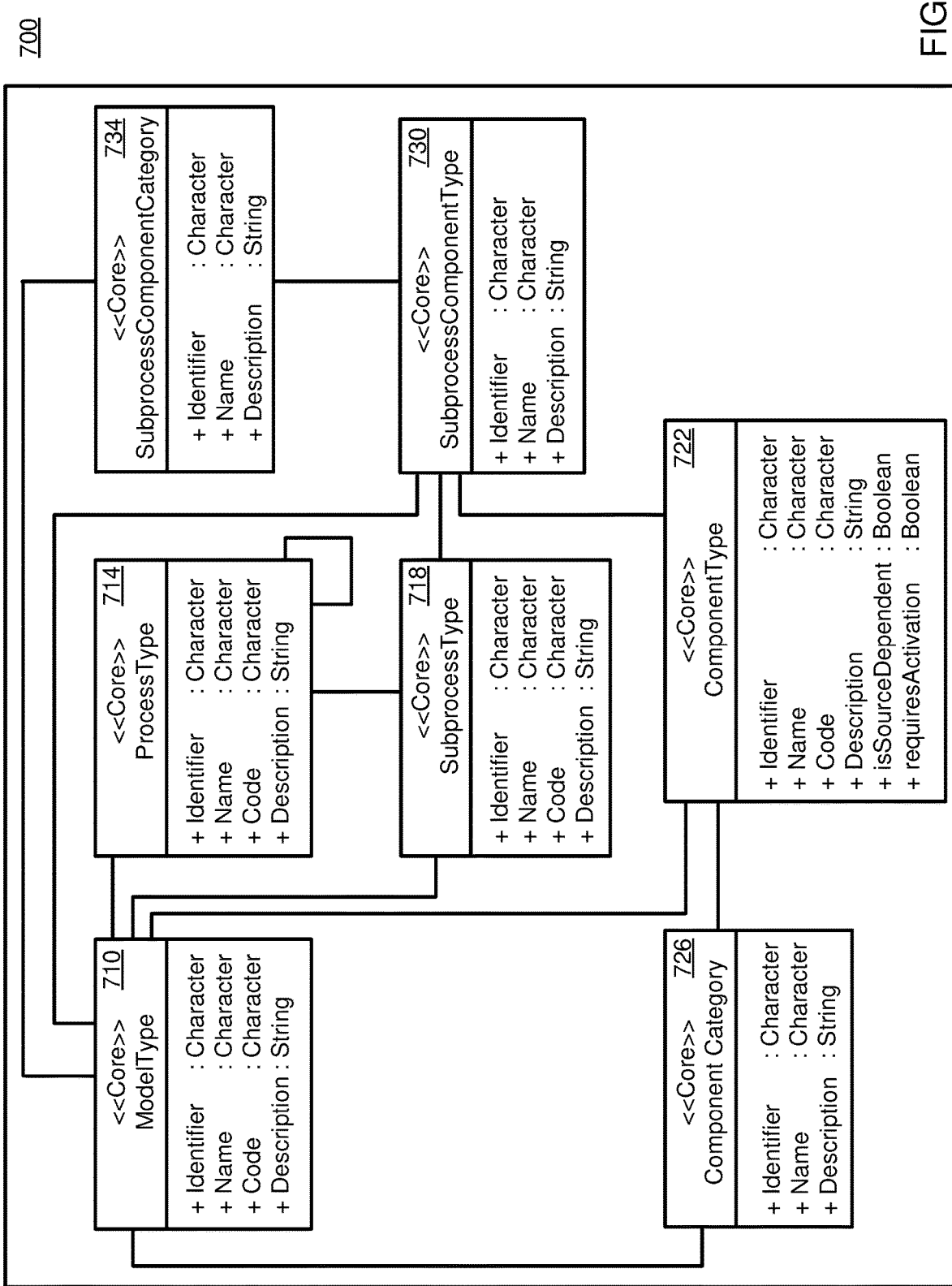
FIG. 7 is a schema, such as core schema, illustrating relationships between various data artifacts of the schema, including a model type, a process type, and types for elements of a process.

FIG. 7 provides a schema 700 that illustrates relationships between different data artifacts that define types, such as for types of data artifacts represented in the schema 600. For example, the schema 700 illustrates that a definition 710 of a model type data artifact is related to a definition 714 of a process type data artifact, a definition 718 of a subprocess type data artifact, a definition 722 of a component type data artifact, a definition 726 of a component category data artifact, a definition 730 of a subprocess component type data artifact, and a definition 734 of subprocess component category data artifact.

Figure 8:
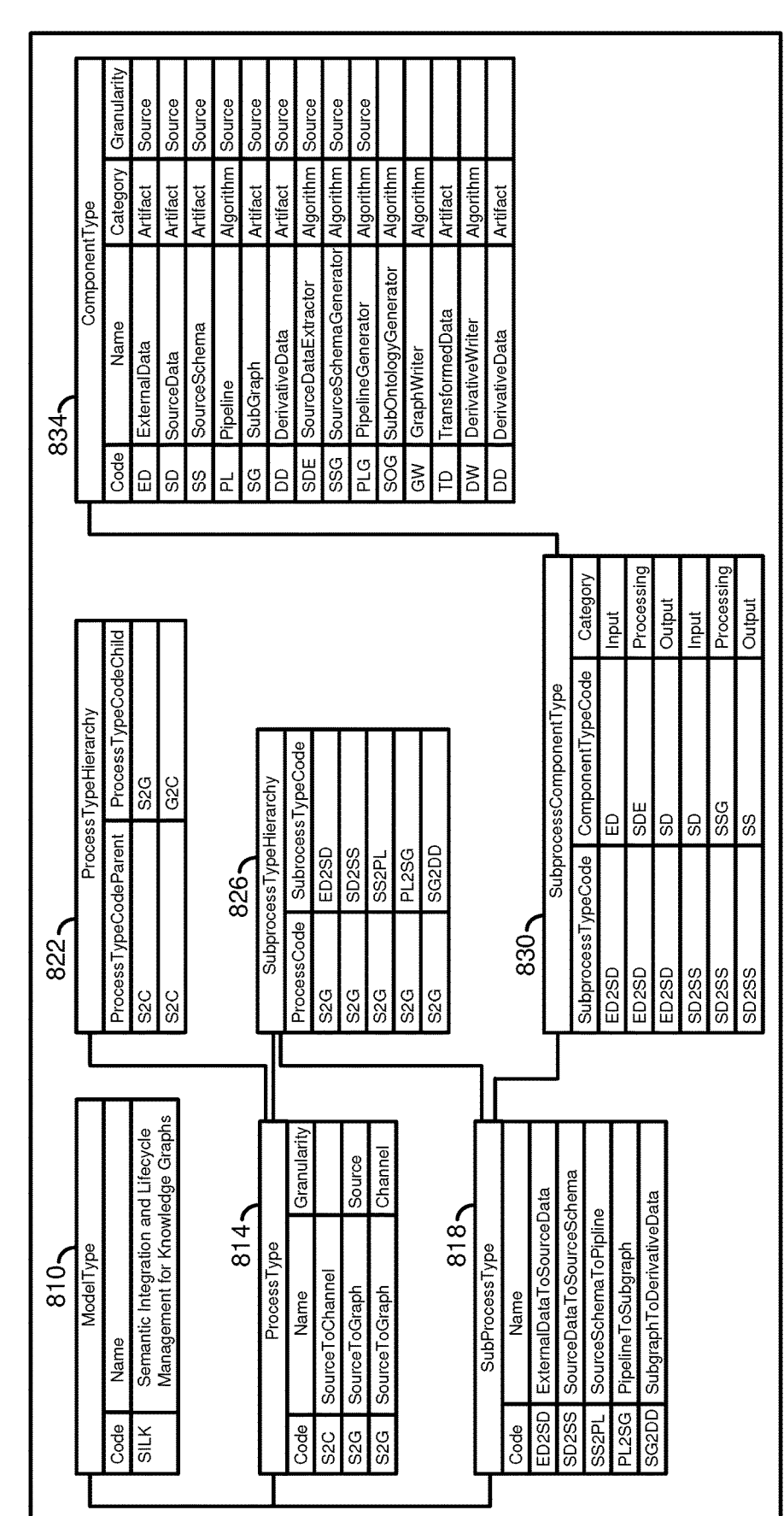
FIG. 8 is a diagram an implementation of the schema of FIG. 6.

FIG. 8 provides a specific implementation 800 of the schema 700. It can be seen that a model type data artifact 810 is linked to a process type data artifact 814, which contains three different process types. The model type data artifact 810 is also linked to a subprocess type data artifact 818. The subprocess type data artifact 818 provides identifiers of several subprocess types included in the model type. These subprocesses types can be for a specific process type for the model type, such as being subprocess of the SourceToGraph process type represented in the process type data artifact 810.

A process type hierarchy data artifact 822 defines relationships between process types of the process type data artifact 814. For example, both the source-to-graph process and the graph-to-channel process can be defined as child processes of a source-to-channel process.

A subprocess type hierarchy data artifact 826 associates particular subprocess types of the subprocess type data artifact 818 with particular processes of the process type data artifact 814. In the example shown, all subprocesses in this hierarchy are subprocesses of the source-to-graph process.

A given subprocess type can be associated with one or more subprocess component types of a subprocess component type data artifact 830. The subprocess component type data artifact 830 can be used to assign components of a component type data artifact 834 to specific roles in a subprocess. For example, the subprocess component type data artifact 830 associates the external data-to-source data subprocess type with an input component, a processing component, and an output component, where specific components of the component type data artifact 834 are assigned to each role.

Figure 9A:
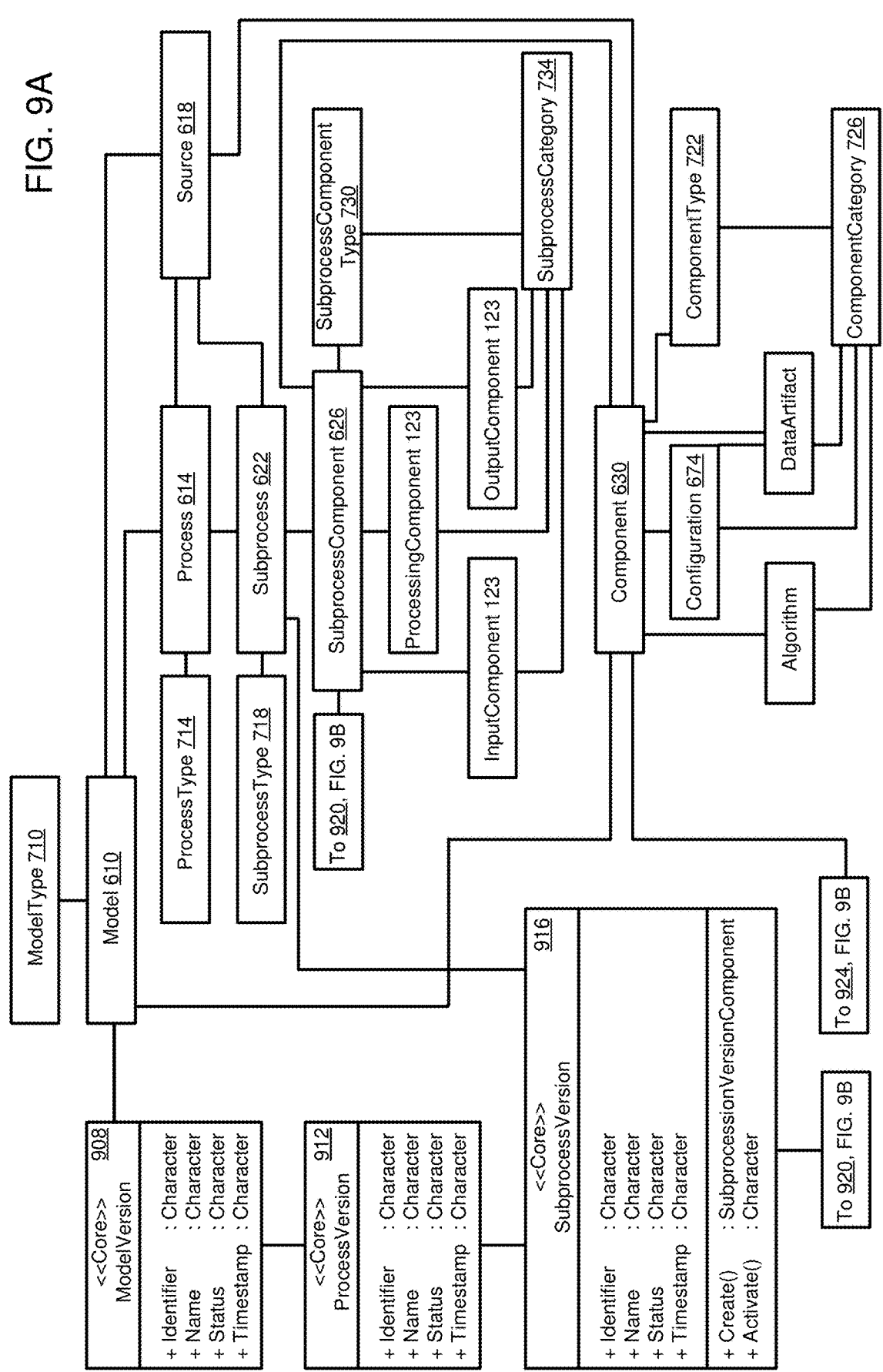
FIGS. 9A and 9B present a schema representing the combination of the schema of FIG. 6 and the schema of FIG. 7.
Figure 9B:
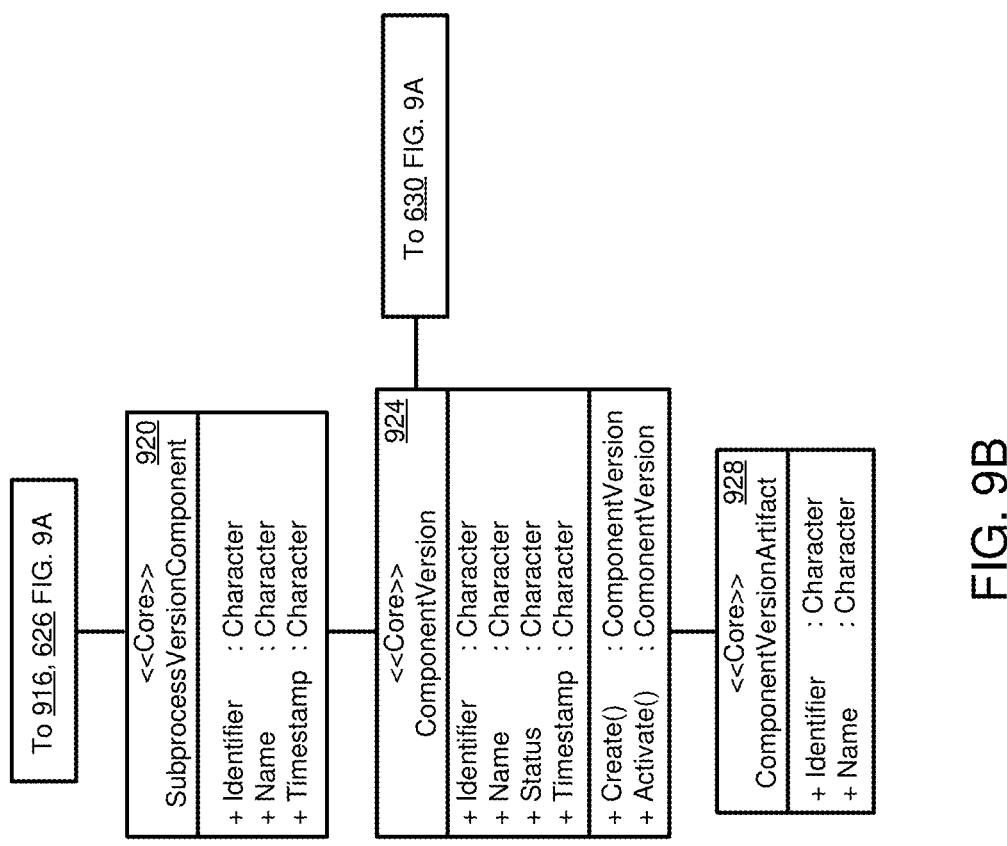

FIGS. 9A and 9B illustrate a schema 900 showing how the schema 600 of FIG. 6 and the schema 700 of FIG. 7 can be combined, along with data artifacts that provide version information. For clarity, data artifacts from FIGS. 6 and 7 retain their respective reference numbers.

In general, FIGS. 9A and 9B illustrate how models, processes, subprocesses, and components can be associated with types, and related to data artifacts providing version information. For example, the model 610 is associated with a model type 710 and a definition 908 for a model version data artifact. The definition 908 is related to a definition 912 for a process version data artifact, which in turn is related to a definition 916 for a subprocess version data artifact. Note that the definition 916 of the subprocess version data artifact includes methods to create subprocess version components and to activate subprocesses.

The subprocess data artifact 622 is associated with a subprocess type data artifact 718, as well as the definition 916 of the subprocess version data artifact. The subprocess component data artifact 626 is related to the subprocess data artifact 622 and the subprocess component type data artifact 730. Both the definition 916 of the subprocess version data artifact and the subprocess component data artifact 626 are related to a definition 920 of a subprocess version component data artifact, shown in FIG. 9B.

With continued reference to FIG. 9B, the definition 920 of the subprocess version component data artifact is related to a definition 924 of a component version data artifact, which in turn is related to a definition 928 of a component version data artifact and the component data artifact 630 of FIG. 9A.

Returning to FIG. 9A, in addition to being associated with the subprocess component type data artifact 730, the subprocess component data artifact 626 is shown as associated with a definition 940 of an input component data artifact, a definition 944 of a processing component data artifact, and a definition 948 of an output component data artifact. The data artifacts 940, 944, and 948 can serve as subclasses of the subprocess component data artifact 626. The data artifacts 940, 944, 948 are also associated with a subprocess category data artifact 734, which is also associated with the subprocess component type data artifact 730.

The model 610 is associated with the component data artifact 630, where the component data artifact is associated with the definition 924 of the component version data artifact of FIG. 9B. The model 610 is associated with the data artifact 618 for a source, where the source data artifact is also associated with the component data artifact 630, the subprocess data artifact 622, and the process data artifact 614. The component data artifact 630 is also associated with a component type data artifact 722 and can be associated with an algorithm data artifact 970, a configuration data artifact 974, or a component version data artifact 928. The data artifacts 970, 974, and 978 can serve as subclasses of the component data artifact 630. The data artifacts 970, 974, and 978 are associated with a component category data artifact 726, which is also associated with the component type data artifact 722.

Example 7)—Example Core, Taxonomy, and Domain Models and Relationships Therebetween, and Example Domain Model Instances Described techniques can include associating ingested data with a semantic context, such as by representing the data in a knowledge graph or otherwise associating it with a contextual schema.

Figure 10:
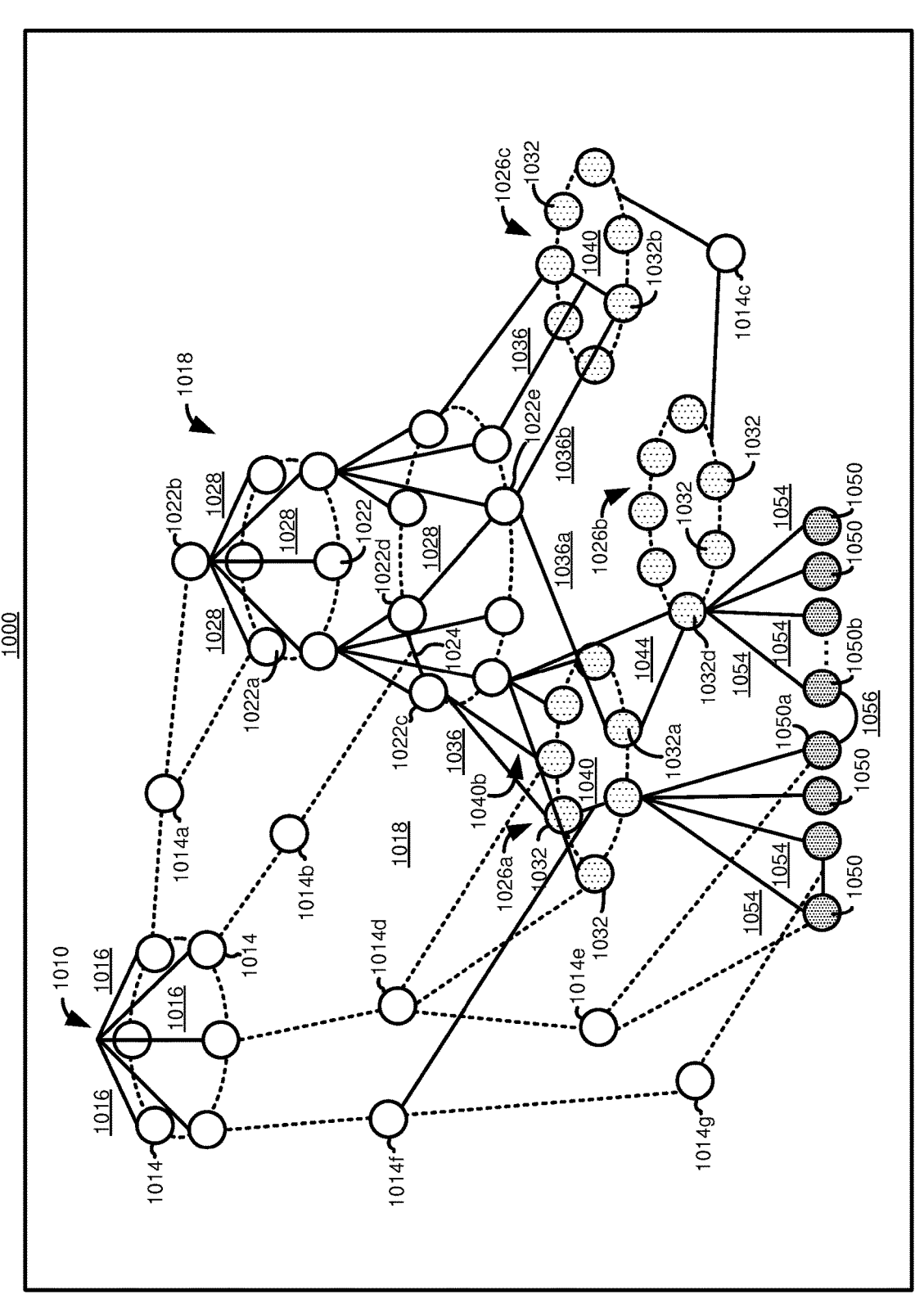
FIG. 10 is a diagram of a graph representation of various related models, including a core model, a taxonomy model, and a plurality of domain models.

FIG. 10 illustrates a modeling environment 1000 that depicts how a core data model can relate to a taxonomy model, where the core model and the taxonomy model can be related to one or more domain models. In turn, instances, such as instances of classes in a knowledge graph and their associated properties, can be associated with elements of the core data model and one or more domain models.

The computing environment provides a core data model 1010, having core nodes 1014 (empty circles). Core nodes 1014 of the core data model 1010 represent particular organizing concepts for a schema, such as a knowledge graph. In this case, the core nodes 1014 include a node 1014*a* that represents a stereotype. A stereotype refers to a generalizable and reusable template or archetype within the core data model that defines a conceptual structure or behavior that can be realized or instantiated in other models. For example, a stereotype in the core data model 1010 might represent a high-level organizational concept, such as "entity," "attribute," or "relationship type," which can be specialized or instantiated as specific nodes and relationships in the taxonomy model or domain models. These realizations allow for consistent application of semantic concepts across different layers of the modeling framework.

At least some nodes 1022 of a taxonomy model 1018 can be realizations of a stereotype, such as nodes 1022*a*, 1022*b*. The core nodes 1014 include a relationship type node 1014*b*, which defines a particular type of relationship between nodes 1022 of the taxonomy model 1018, such as a relationship between nodes 1022*c* and 1022*d*. An example relationship type can be "property of," such as when one node in the relationship corresponds to a class and another node is a property of the class.

Nodes 1014 of the core data model 1010 can also provide organizational classifications for nodes of domain models, where FIG. 10 includes domain models 1026*a*, 1026*b*, and 1026*c*. The core data model 1010, the taxonomy model 1018, and the domain models 1026*a*-1026*c* can be implemented in a number of ways, but in a particular example, they are implemented as a knowledge graph.

To help understand FIG. 10, it can be useful to consider the nodes of a given model with respect to elements of a relational database data model. The core data model 1010 can provide basic organizational components, such as defining concepts of tables, columns, and relationships between tables and columns. The taxonomy model 1018 can represent standardized semantic concepts and relationships, such as particular table names and particular attributes that are available for use in a table, or provide additional details regarding structural components of the core data model 1010, such as particular table or column types.

A domain model 1026 is a specific realization of at least a portion of the taxonomy model 1018, where names of nodes and relationships may differ from those used in the taxonomy model, but where links between nodes of the taxonomy model and nodes of the domain model allow domain models to be mapped to the standardized taxonomy of the taxonomy model.

Some nodes of the taxonomy model 1018 or a domain model 1026 can represent data objects, such as tables or views. Other nodes can represent attributes (columns/fields) of the tables or views and are modeled as classes. A foreign key relationship between two database tables can be an example of a type of relationship between nodes.

The core nodes 1014 are related by core edges 1016. The core edges 1016 define particular types of relations between a pair of connected core nodes 1014. Although the core data model 1010 is shown as having a single core edge 1016 between any pair of connected core nodes, in at least some implementations multiple core edges can exist between a pair of core nodes.

The core edges 1016 help define how the core nodes 1014, and their associated semantic concepts, can be used to produce a data model that can be implemented in a computing system. The core edges 1016 can also be used to describe hierarchical relations between core nodes 1014, where a hierarchical relation can also be used in defining more complex modeling concepts from the core nodes.

The taxonomy model 1018 can be structured in a similar manner to the core model 1010, in that nodes 1022 of the taxonomy model can be connected by taxonomy edges 1028. For simplicity, not all relationships between taxonomy nodes 1022 are shown in FIG. 10. Continuing the example of the taxonomy nodes 1022 and taxonomy edges 1028, or the nodes and edges of a domain model being useable to represent a data model of a relational database, one node can represent a table, and other nodes can represent attributes. A complete table can be defined by relating the node representing the table to the nodes representing attributes using edges of a suitable relation type. For example, a node representing the table can be linked to the taxonomy nodes representing its attributes using an edge of type "has attribute" or "has component."

Note that relations between nodes can be expressed from the "point of view" of either node. Using the previous example, the nodes representing table attributes can be related to the node representing the table using an edge of type "attribute of" or "component of" A relation in one direction between nodes can be referred to as a "relation" (which can also be referred to as a "relationship" or a "predicate"), while the relation considered in the other direction can be referred to as an "inverse relation" (or "inverse relationship" or "inverse predicate"). A given relation or inverse relation can represent an instance of a particular relation type.

As described, a domain model 1026 represents a particular implementation of at least a portion of the taxonomy nodes 1022 of the taxonomy model 1018, and their associated relations (including as indicated by taxonomy edges 1028). The domain models 1026 are shown as including domain nodes 1032. In at least some implementations, relations between domain nodes 1032, at least within a given domain model 1026, are not expressed using edges between domain nodes. Rather, edges 1036 link a domain node 1032 with its corresponding taxonomy node 1022. Relations between domain nodes 1032 can be determined by analyzing the taxonomy edges 1028 that exist between a pair of taxonomy nodes 1022 that are linked to the domain nodes by their corresponding edges 1036. In other cases, edges 1040 can be used to directly link domain nodes 1032 of a domain 1026, where the edges can be optionally linked (via edges 1036) to corresponding taxonomy model edges 1028.

FIG. 10 illustrates how domain nodes 1032 from multiple domain models 1026 can be linked to a common node 1022 of the taxonomy model 1018. For example, edges 1036a and 1036b link domain nodes 1032a and 1032b to taxonomy node 1022e. In practice, many domain nodes 1032 from multiple domain models 1026 will be linked to common taxonomy nodes 1022. The single common taxonomy node 1022a is shown for simplicity of presentation.

As an example of relations between domain nodes 1032 of different domain models 1026, consider that a node in a first domain represents a "business process" and has a relation to a corresponding taxonomy node 1022. A second domain may include a domain node 1032 that contains a "process element" node that is linked to the same taxonomy node 1022 as the domain node of the first domain. Thus, the domain nodes 1032 of the first and second domain models 1026 can represent the same semantic concept, in the form of taxonomy node 1022.

In addition to, or in place of, relating domain nodes 1032 of different domains 1026 through a taxonomy node 1022, domain nodes of different domains can be directedly related, such as using edges 1044. Since the taxonomy model 1018 represents general semantic concepts that are represented in different domain models 1026, the taxonomy data model may not be "aware" that different domains exist, or at least that two domain models have a more direct relationship.

The concept of "derivatives" was discussed earlier. A derivative can be used to express that a domain node 1032 is a realization of a taxonomy node 1026. The term derivative can also be used to indicate that related domain notes 1032 of different domains refer to the same semantic concept, or instances thereof.

One or more instances 1050 of a domain node 1032 can be created and are related to the domain nodes via edges 1054. Instances 1050 are specific to a particular domain node 1032 and therefore specific to a particular domain model 1026. Note that relations can also be established between domain instance nodes 1050. For example, a node 1050a in a first domain can represent a business process of "accrual management," while a node 1050b in a second domain can have a process element "manage accruals" with a similar meaning. Relations between domain instance nodes 1050 can be represented as edges, in a similar manner as the edges 1030, 1036, and 1040, as shown by an edge 1056.

FIG. 10 provides additional examples of how core nodes 1014 can be linked to nodes of other models, or instances of domain models. For example, node 1014c represents a concept of a domain and can be linked to the domains 1026. A core node 1014d represents a type, which is realized by domain nodes 1032, and a core node 1014e representing instances of types, which are realized by instances 1050. A core node 1014f represents relations between domain nodes 1032, while a core node 1014g represents relations between instances.

Figure 11:
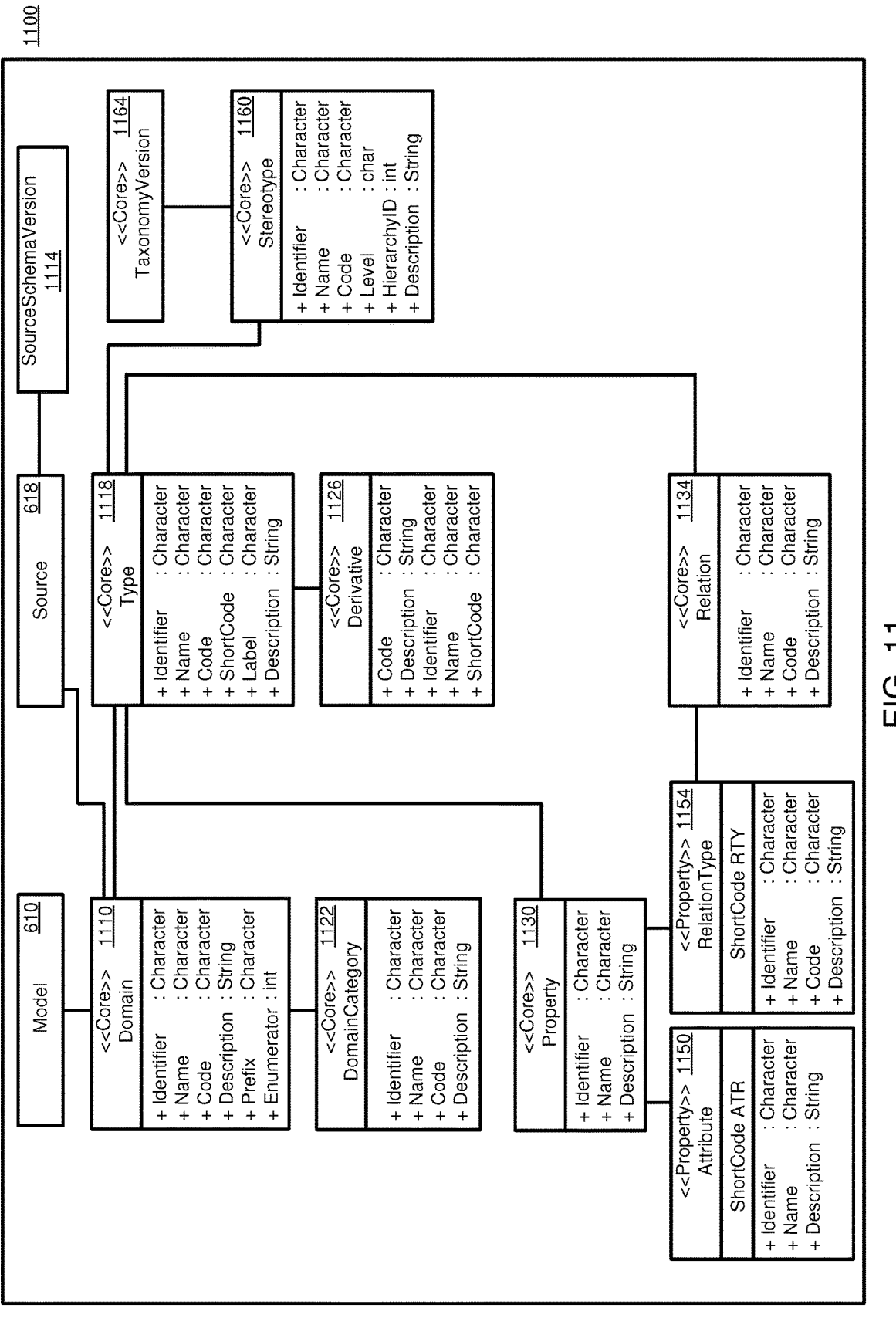
FIG. 11 is a schema illustrating an implementation of a core model, a domain model, and a taxonomy model corresponding to elements of FIG. 10.

FIG. 11 provides an example schema 1100 that illustrates elements of the modeling environment 1000 of FIG. 10 and their interactions. The schema 1100 includes a model data artifact 610 and a source data artifact 618, as described with respect to FIG. 6. These data artifacts are each associated with a domain data artifact 1110, which represents a specific realization of at least part of a taxonomy model. The source data artifact 618 is further linked to a source schema version data artifact 1114, capturing the evolution of schemas over time. This versioning supports the ability to map changing schema elements to consistent semantic standards in the taxonomy model.

The domain data artifact 1110 is associated with a type data artifact 1118 and a domain category data artifact 1122. The type data artifact 1118 serves as an abstract organizing construct derived from the core data model and is further associated with a derivative data artifact 1126, reflecting its dynamic adaptation to support schema mappings or transformations. The type data artifact 1118 also defines structural relationships to a property data artifact 1130 and a relation data artifact 1134, which are additional constructs derived from the core model. For example, properties can represent attributes or characteristics of a domain concept, while relations define specific interactions or dependencies between domain elements. The domain model is linked to the taxonomy model through a relationship between the type data artifact 1118 (a taxonomy model artifact) and a stereotype data artifact 1160 (also a taxonomy model artifact), where the stereotype data artifact is further associated with a taxonomy version data artifact 1164.

The schema 1100 also illustrates how a taxonomy model interacts with the core data model. The taxonomy model extends the core model by introducing taxonomy-specific artifacts, such as an attribute data artifact 1150 and a relation type data artifact 1154, which are linked to the property data artifact 1130 and the relation data artifact 1134, respectively. These data artifacts refine the structural elements defined in the core model to support standardized and reusable schema components. For example, an attribute data artifact may represent a specific attribute structure used across multiple domains, while a relation type artifact defines standardized relationships, such as "belongs to" or "is part of," that can be applied universally.

The taxonomy model further incorporates semantic concepts that standardize domain-independent representations of schema elements. For instance, the taxonomy model may define a concept like "order," which serves as a semantic anchor for mapping domain-specific elements from different source schemas. For example, a domain-specific "purchase order" or "sales order" can be mapped to the standardized "order" element in the taxonomy model. This mapping provides consistency across domains while enabling semantic alignment.

The source schema is dynamically mapped to the taxonomy model, with its domain-specific elements linked to corresponding taxonomy artifacts through derivatives and other mappings. For instance, a source schema version might define specific data structures, such as "customer_id" or "order_date," which are linked to standardized concepts in the taxonomy model like "Customer" or "Order Date." The taxonomy model allows these mappings to remain consistent even as source schemas evolve over time, supported by schema versioning mechanisms.

The core data model continues to provide the foundational structure underlying both the taxonomy model and the domain models. The core model includes constructs like type, property, and relation, which are refined in the taxonomy model and further instantiated in the domain models. For example, a domain model 1110 may define a specific realization of taxonomy elements, such as an enterprise-specific schema for "Customer Data," which maps its elements back to the taxonomy model for consistency and interoperability.

FIG. 11 demonstrates the interplay between the core mode, the taxonomy model, and domain models, illustrating how elements of each layer support schema mapping, alignment, and standardization. The taxonomy model's dual role as a structural extension of the core model and as a semantic framework for domain alignment enables the integration of diverse schemas and supports evolving source schemas through versioned mappings.

Figure 12A:
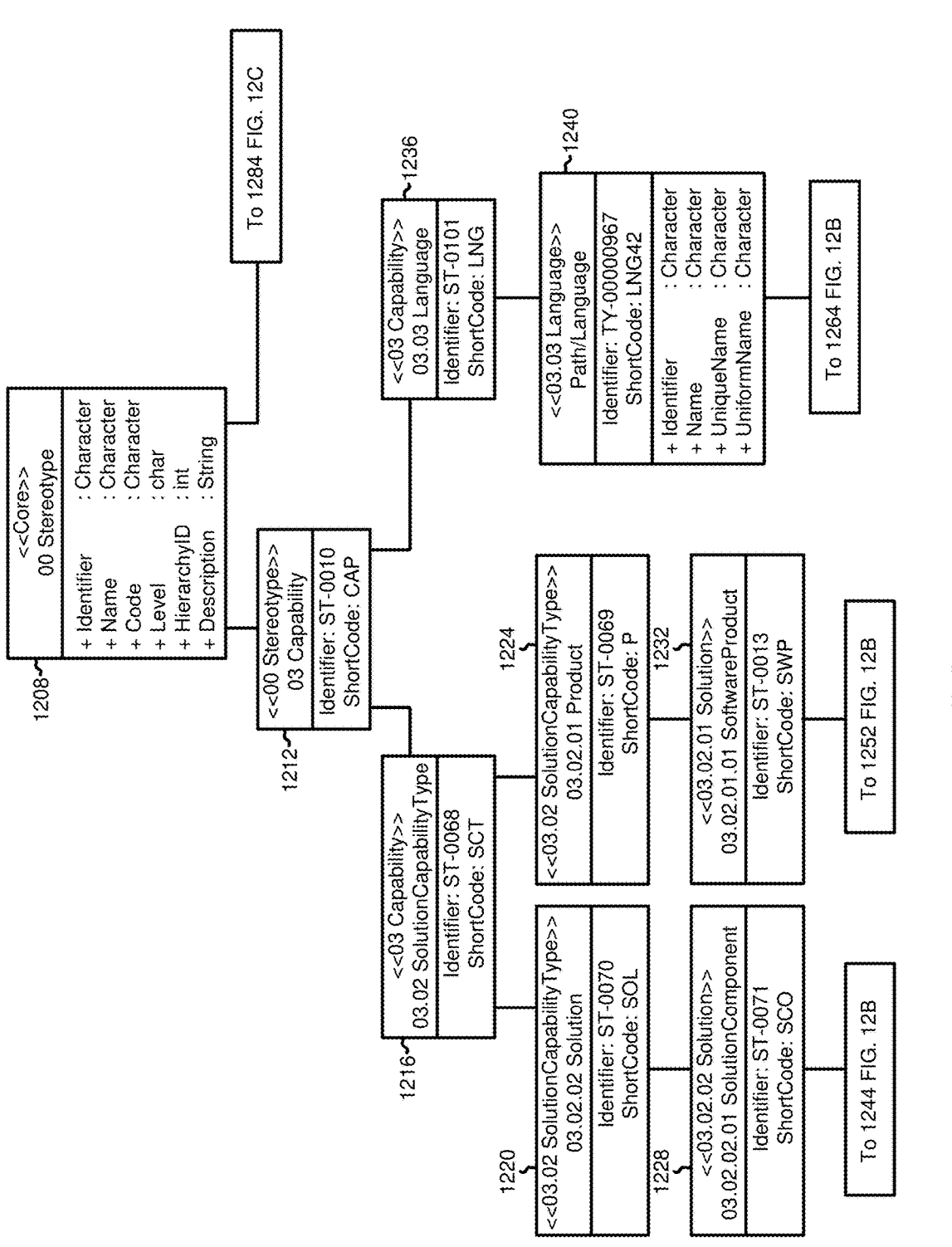
FIGS. 12A-12C provide a schema illustrating how core, taxonomy, and domain model elements can be represented and related.
Figure 12B:
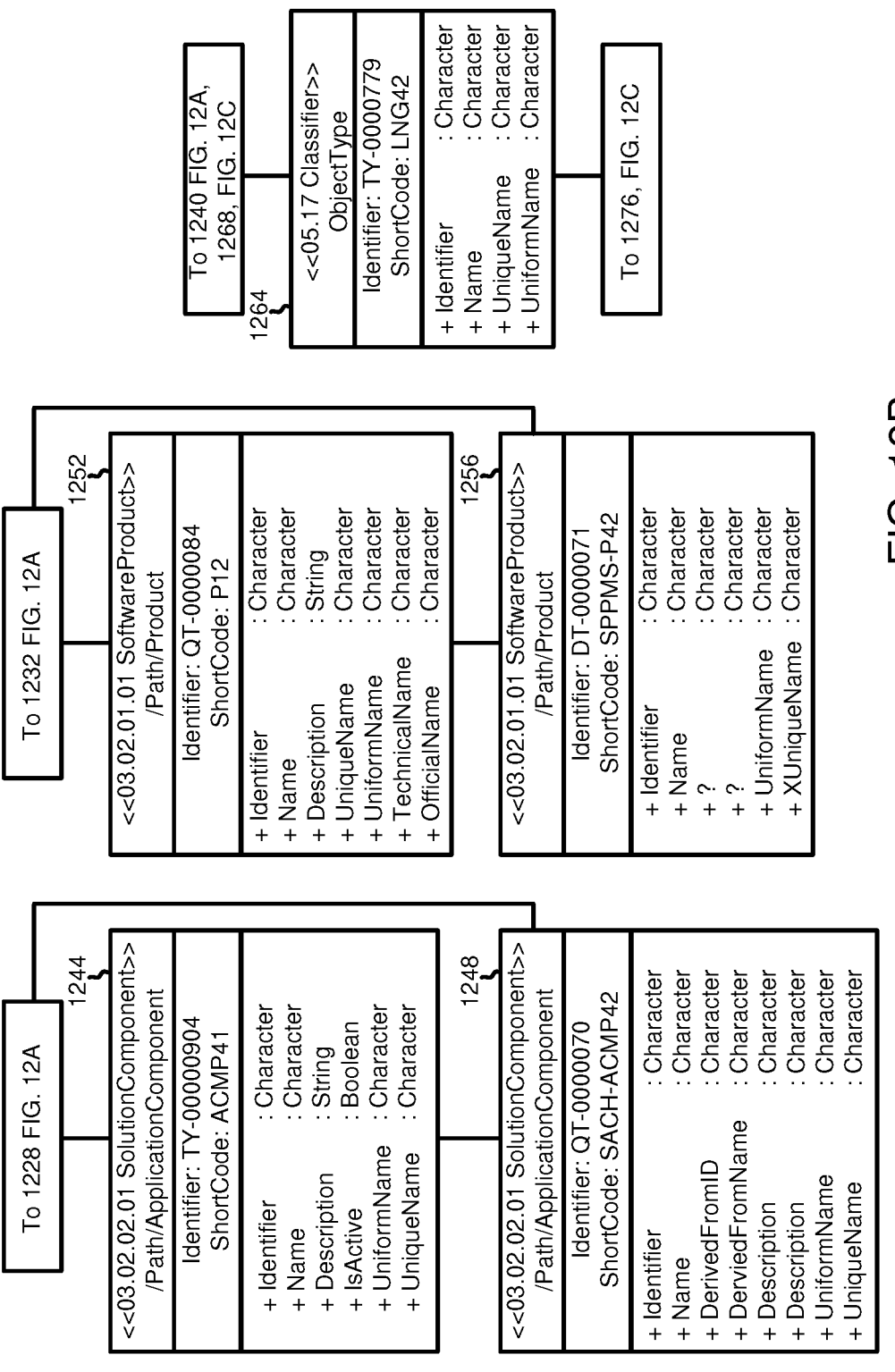
Figure 12C:
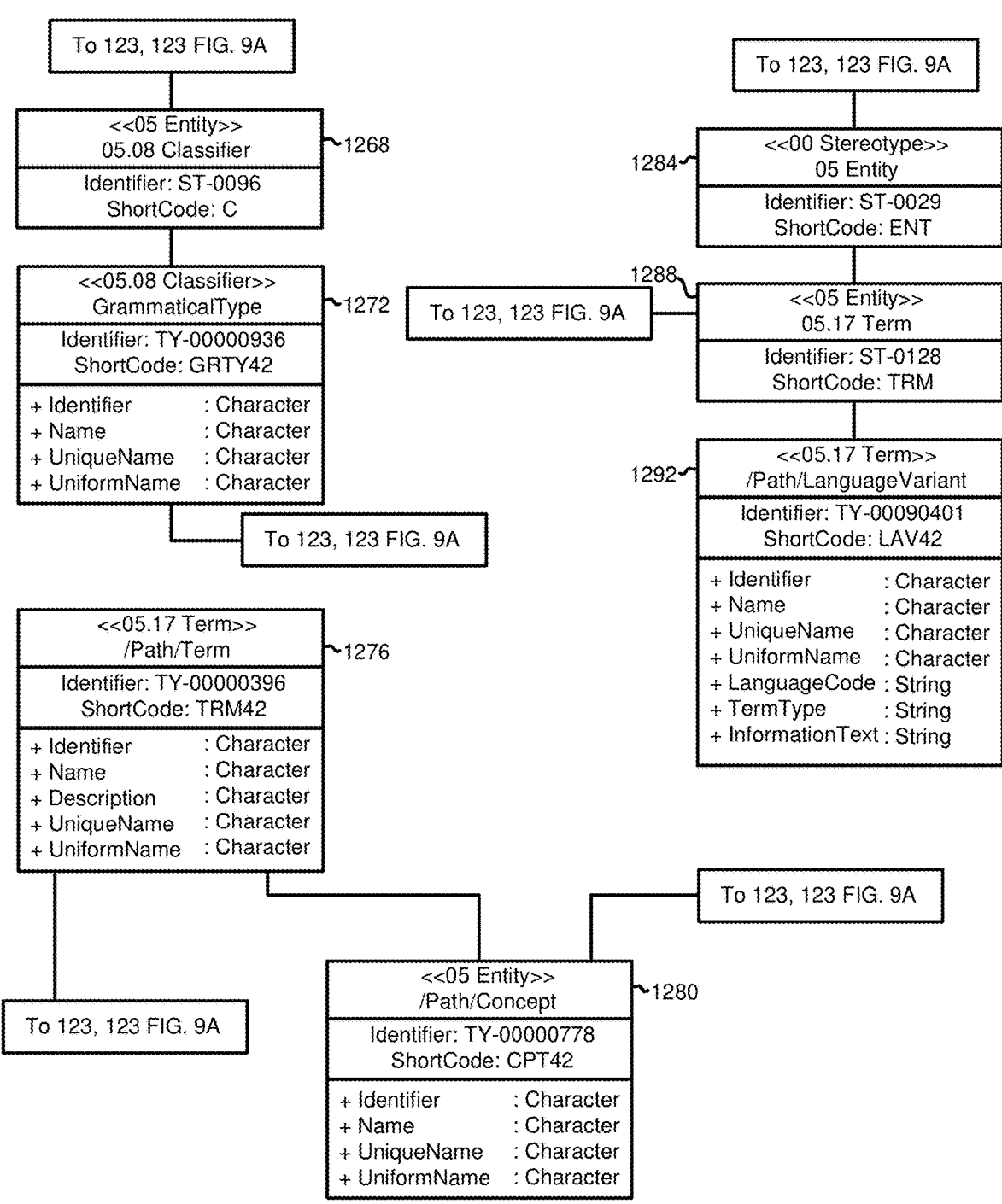

FIGS. 12A-12C illustrate an example data model 1200 organized according to the modeling environment 1000 that associates ingested data with semantic information. For example, the source data artifact 618 and the model artifact 610 of FIG. 6 can be associated with a domain, where the domain is linked to a semantic model, such as a knowledge graph, which may include an associated ontology.

In the data model 1200, artifact 1208 corresponds to a node of the core data model 1010 of FIG. 10. Data artifacts 1212, 1216, 1220, 1224, 1228, 1232, 1268, and 1284 correspond to nodes of the taxonomy model 1018 of FIG. 10, representing standardized semantic concepts and structural extensions of the core model. Data artifacts 1240, 1244, 1252, 1264, 1272, 1276, 1280, and 1292 correspond to nodes of a domain model 1026 of FIG. 10, representing domain-specific implementations of taxonomy elements. Data artifacts 1248 and 1256 also correspond to a domain model 1026 of FIG. 10 but are part of a different domain than the domain associated with data artifacts 1240, 1252, and 1264. Linking data artifacts from different domains facilitates the alignment of common semantic concepts and enables operations such as associating data in one domain with data in another.

The term "derivative" is used to describe relationships in two complementary contexts. First, a derivative represents the relationship between a source schema and the local schema (taxonomy model), capturing the semantic mapping of domain-specific constructs in the source schema to standardized elements in the taxonomy model. For example, a source schema element like "sales order" can be mapped to the standardized semantic concept "order" in the taxonomy model through a derivative relationship. Second, a derivative describes relationships between artifacts in different domains that share a common semantic concept. For example, domain-specific representations of "customer" in two different domain models may be linked as derivatives, reflecting their shared mapping to the standardized "customer" concept in the taxonomy model.

Additionally, the derivative concept provides significant benefits when relating data from two different sources. By reusing data from one source in the context of another source, the second source can add new properties or relations to the original data, enriching its context and usability. This approach supports the decoupling of data from different sources, allowing each source to maintain its integrity while enabling the mapping of corresponding entities. For example, in FIG. 12B, the entity represented by 1244 with ShortCode ACMP41 is reused in another source, represented by 1248 with ShortCode SACH-ACMP42. The second source adds properties or relations to the instances from the original source, facilitating comprehensive data integration and enhancing the ability to perform cross-source analytics and reporting.

The derivative concept is also applicable within the same source, particularly when different subgraphs are created from the same source data at different times or under different conditions. This is especially useful for tracking relationships between data ingested using different processes. For example, data from the same source might be processed using different ingestion pipelines, resulting in subgraphs that reflect various transformations or enhancements. The derivative relationship can link instances across these subgraphs, maintaining a clear lineage of how data has evolved through different processing stages. For instance, a subgraph created using one process might contain an instance of a product with certain properties, while another subgraph created using a different process contains an updated instance of the same product with additional properties or relations. The derivative relationship allows these instances to be linked, reflecting their evolution and supporting consistent data usage. This approach enhances traceability, consistency, and integration within the same source, making it easier to manage and analyze data over time.

Figure 13:
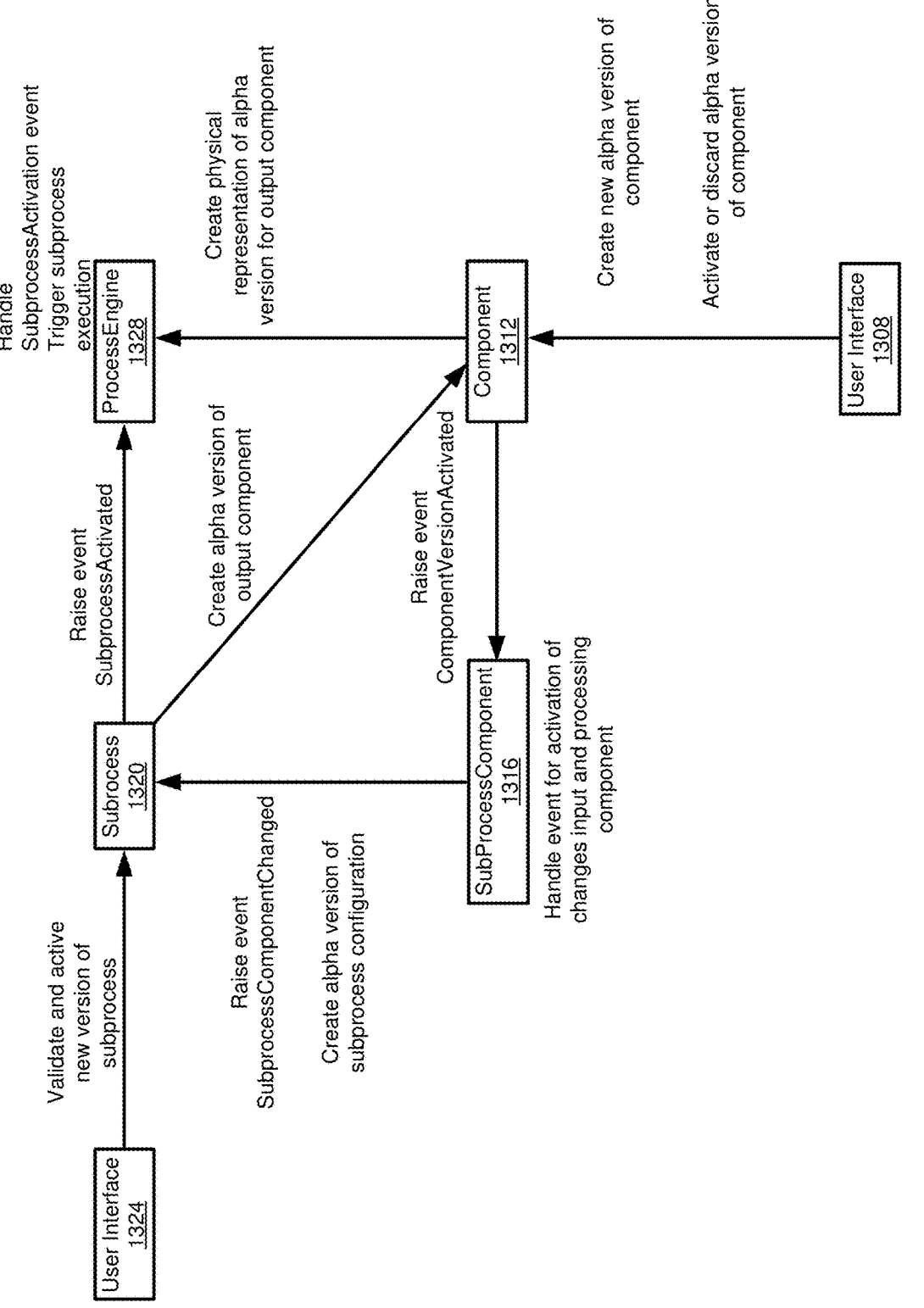
FIG. 13 illustrates operations, and associated events that can be generated as a result of the operations, in processing source data using disclosed techniques.
Figure 14:
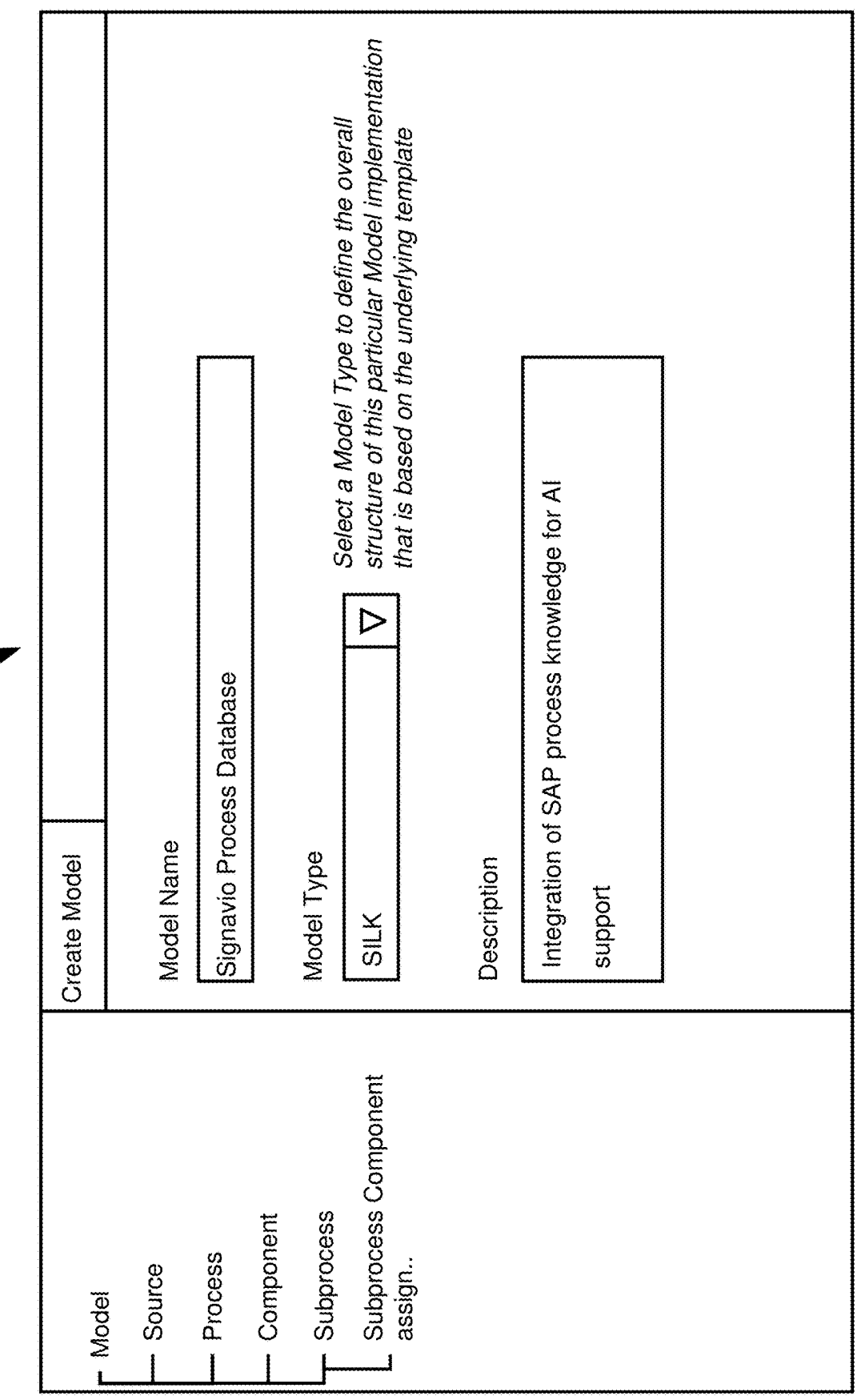
FIG. 14 is an example user interface where a user can define a model.

Example 8)—Example Events During Process Execution or in Response to Changes to Process Definitions FIG. 13 provides a diagram that illustrates how various operations with respect to a model and its elements, such as subprocesses or components, can trigger various events, including events that affect versioning of model components.

Through a user interface (UI) 1308, a user can perform actions such as validating alpha versions of components 1312, including a new version of an algorithm or an input or output data artifact. In response to the validation, the user can choose to activate or discard the alpha version of the component 1312. Activating the component 1312 causes an event to be raised. The event can be handled with respect to a subprocess component 1316. Thus, a change to a component 1312 results in events affecting subprocesses that use that component. Since multiple subprocesses can use the same component 1312, a change to a component can cause multiple events to be raised, corresponding to subprocesses in which the component is used.

As part of handling the event for the activated component 1312 in relation to the subprocess, an event can be raised that indicates a change to a subprocess component. In response, an alpha version of a subprocess 1320 can be generated. Again, since the same component 1312 can be used by multiple subprocess, a change to a component, and therefore to a subprocess component, can result in multiple events being raised to create alpha subprocess versions.

Through a user interface 1324, which can be the same as the user interface 1308 or different, a user can select to validate and optionally activate the new version of the subprocess 1320. If the user activates the alpha version of the subprocess 1320, an event can be raised to the process engine 1328. The process engine 1328 can, in response to the event, trigger execution of the subprocess. The execution produces a physical representation of an alpha version of an output component. Note that as part of the event indicating that a subprocess component has changed, a new version of the output component 1312 can be created, which can store execution results of the process engine 1328. This means changing a component 1312 can change not just the directly changed components, but other components indirectly. For example, a change to a component 1312, such as an algorithm, results in a new version of that component, but, since the output will now be different from output generated using the older version of the component, a new output component is also generated.

Example 9)—Examples User Interfaces for Defining and Managing Processes

FIGS. 14-21 illustrate various user interfaces that can be provided in implementing the techniques of the present disclosure. A user interface 1400 of FIG. 14 allows a user to create a new model, including a model name, a model type, and a description. The model type provides a template for the model being created, such as what subprocesses and components are available for selection and customization.

Figure 15:
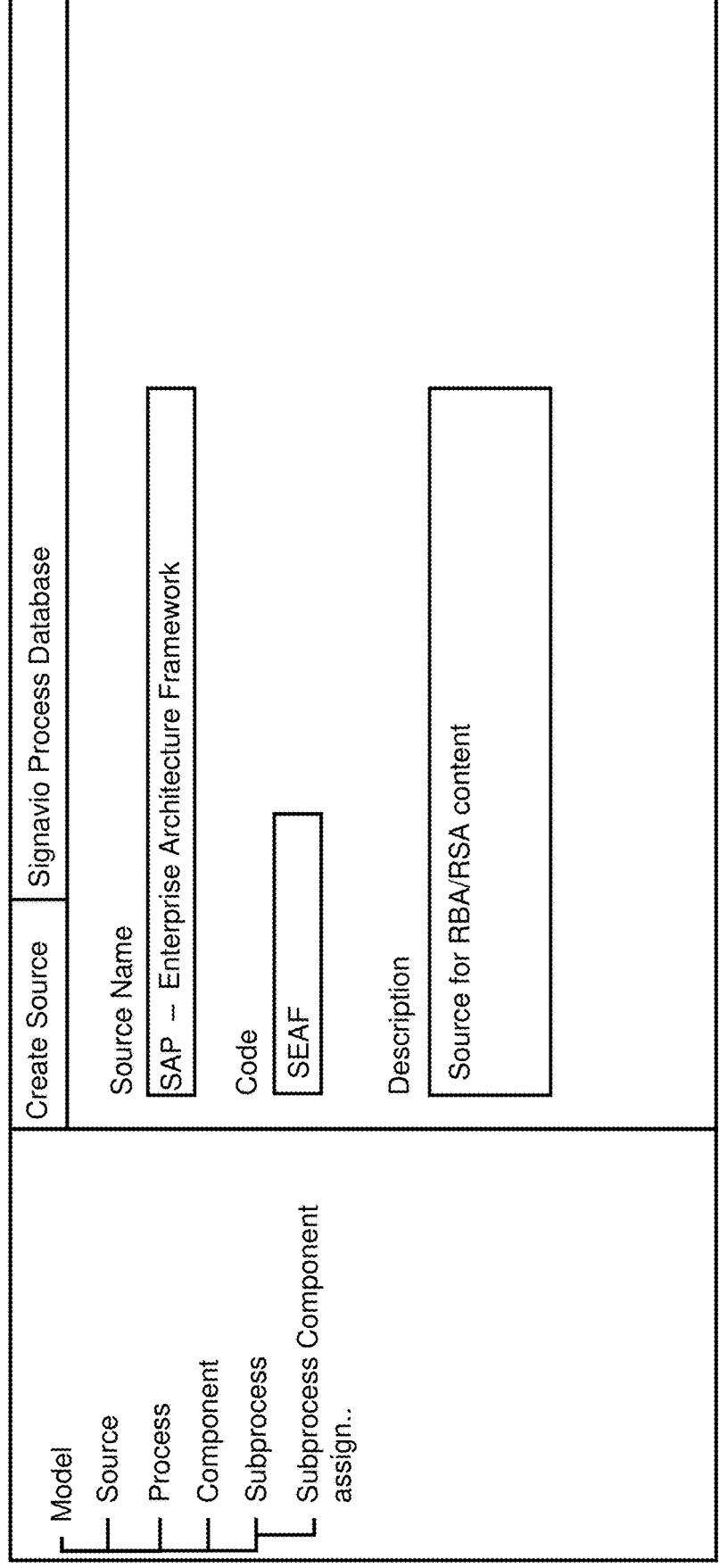
FIG. 15 is an example user interface where a user can define a source to be used with the model.

A user interface 1500 of FIG. 15 allows a user to select or define a source, where the user can provide a source name, a code, and a description for the source. In practice, the user interface 1500 can provide additional user interface elements, such as those that allow a user to configure connecting to and retrieving data from the source. For example, an address or link to a physical repository of the source can be provided, along with administrative information, such as password or login information.

Figure 16:
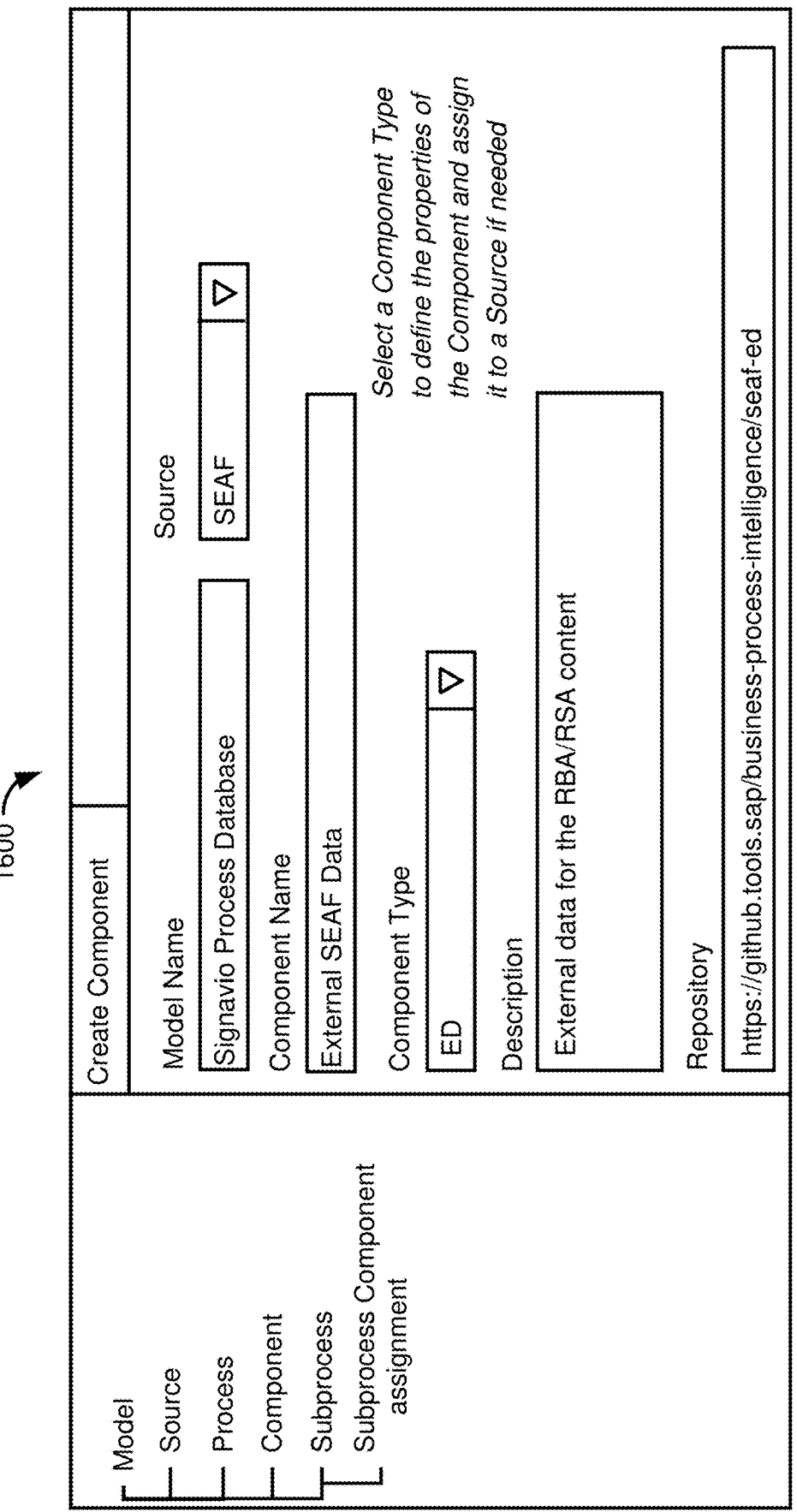
FIG. 16 is an example user interface where a user can define a new component.

Components can be created using the user interface 1600 of FIG. 16. The user interface 1600 allows a user to select a particular source for which the component is to be associated, and indicates the name of the model for which the component is being defined. A user can input a name for the component, and can select a type for the component. In this particular example, the component is of the ExternalData (ED) type. A description of the component can be provided, along with a link to the code implementing the component, such as a repository hosted on a Git-hosted repository.

A user interface 1700 of FIG. 17 allows a user to perform actions relating to component versions. The user interface 1700 provides a version history for a component, where each version in the of the component is associated with a version identifier, a version description, a date and time a component version was created (or activated, depending on implementation), and a status, such as if the component version is active or inactive. As shown, one of the components is an alpha version, and a user can change the status of the alpha version, such as to activate it as an active version, using user interface element 1720. Alternatively, the date and time can refer to a time that a particular status of the component was set. Other information is provided for the component, including its name, source, category (such as data artifact, configuration, or algorithm), type, and the name of the model with which it is associated.

Figure 18:
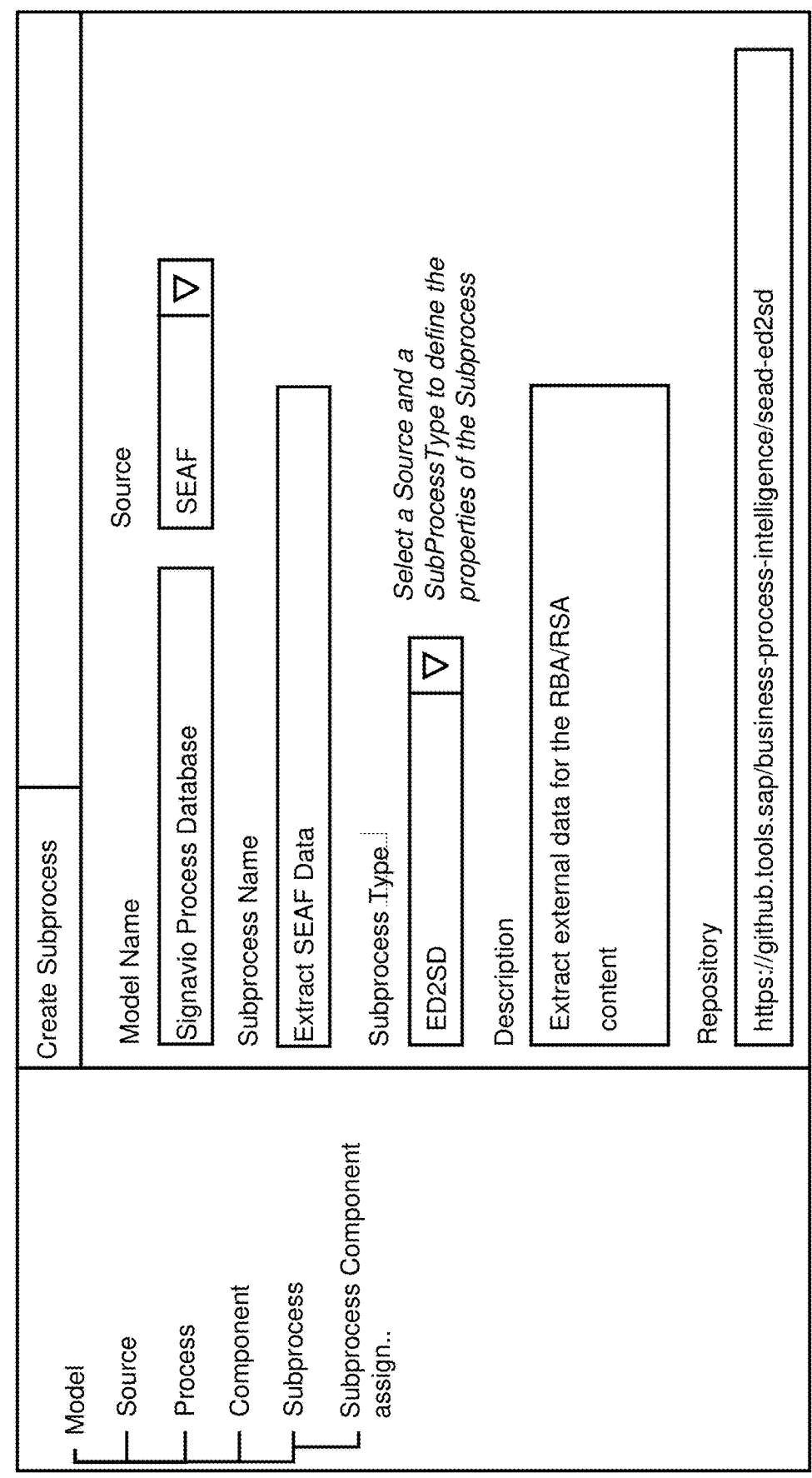
FIG. 18 is an example user interface for creating a subprocess.

A user can define a new subprocess using user interface 1800 of FIG. 18. The name of the model for which the subprocess is being defined is provided, and where a user can select a source for the subprocess, as well as provide a name for the subprocess, a type for the subprocess, and a description for the subprocess. A subprocess type can include those shown in FIG. 3, such as an ExternalDataToSourceData (ED2SD) subprocess. A link to code implementing the subprocess can be provided, such as to a git repository. The subprocess can include, in some cases, defining an order in which components should be called, as well as specifying particular inputs for those components.

Figure 19:
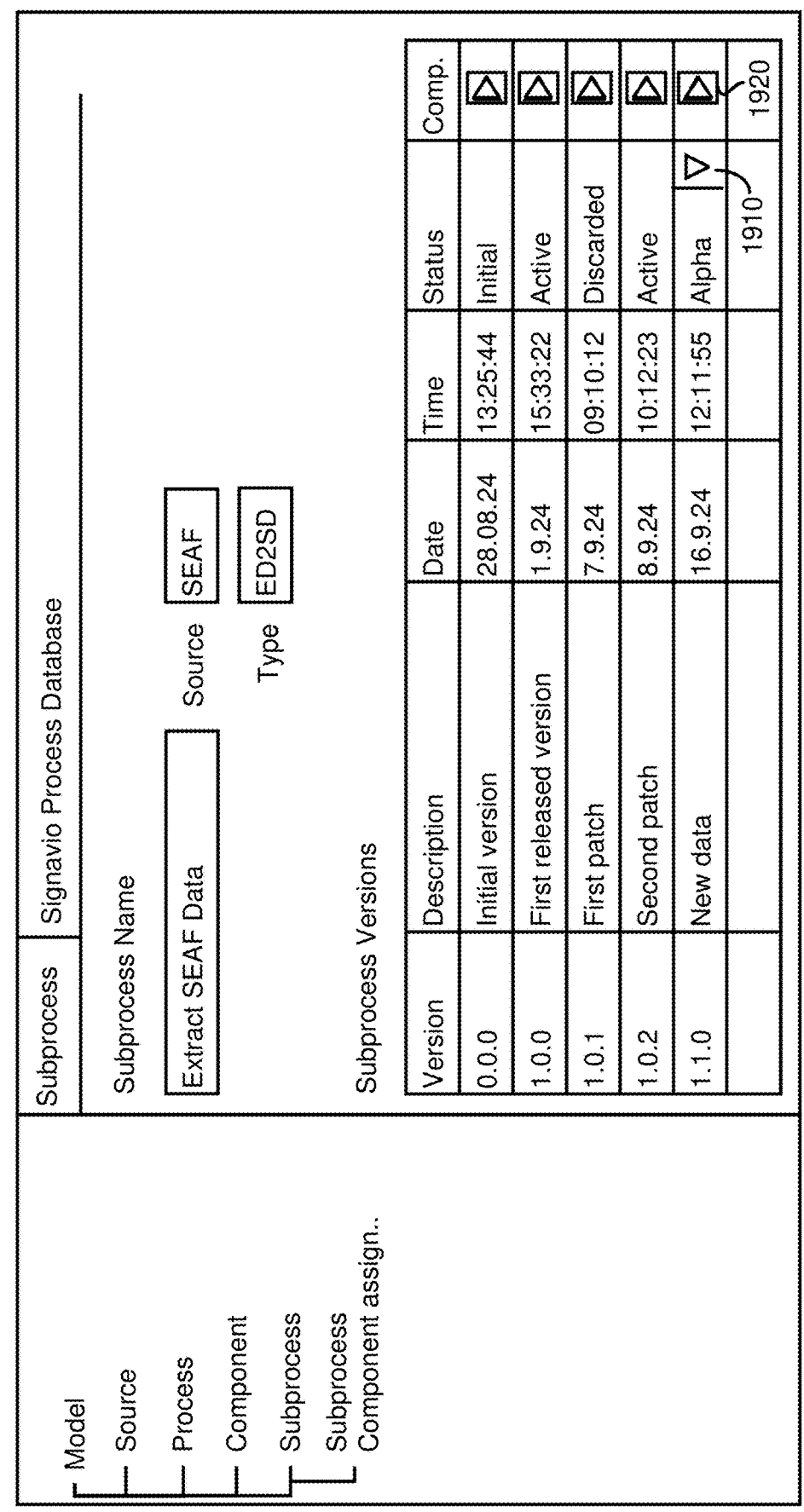
FIG. 19 is an example user interface for managing versions of a subprocess.

FIG. 19 provides a user interface 1900 where a user can view subprocess version information, and take actions regarding versions, such as activating new versions of a subprocess. The user interface 1900 provides information for the subprocess, including its name, the source it is used with, and its type. Version information for the subprocess includes a version identifier for each version of the subprocess, as well as a description, a date and time the subprocess was defined (or activated), and a status. Alternatively, the date and time can refer to a time that a particular status of the subprocess was set. Alpha versions of subprocesses can be activated by selecting a user interface element 1910. The user interface 1900 also provides user interface elements 1920 that can be used to view and edit components assigned to the particular subprocess.

Figure 20:
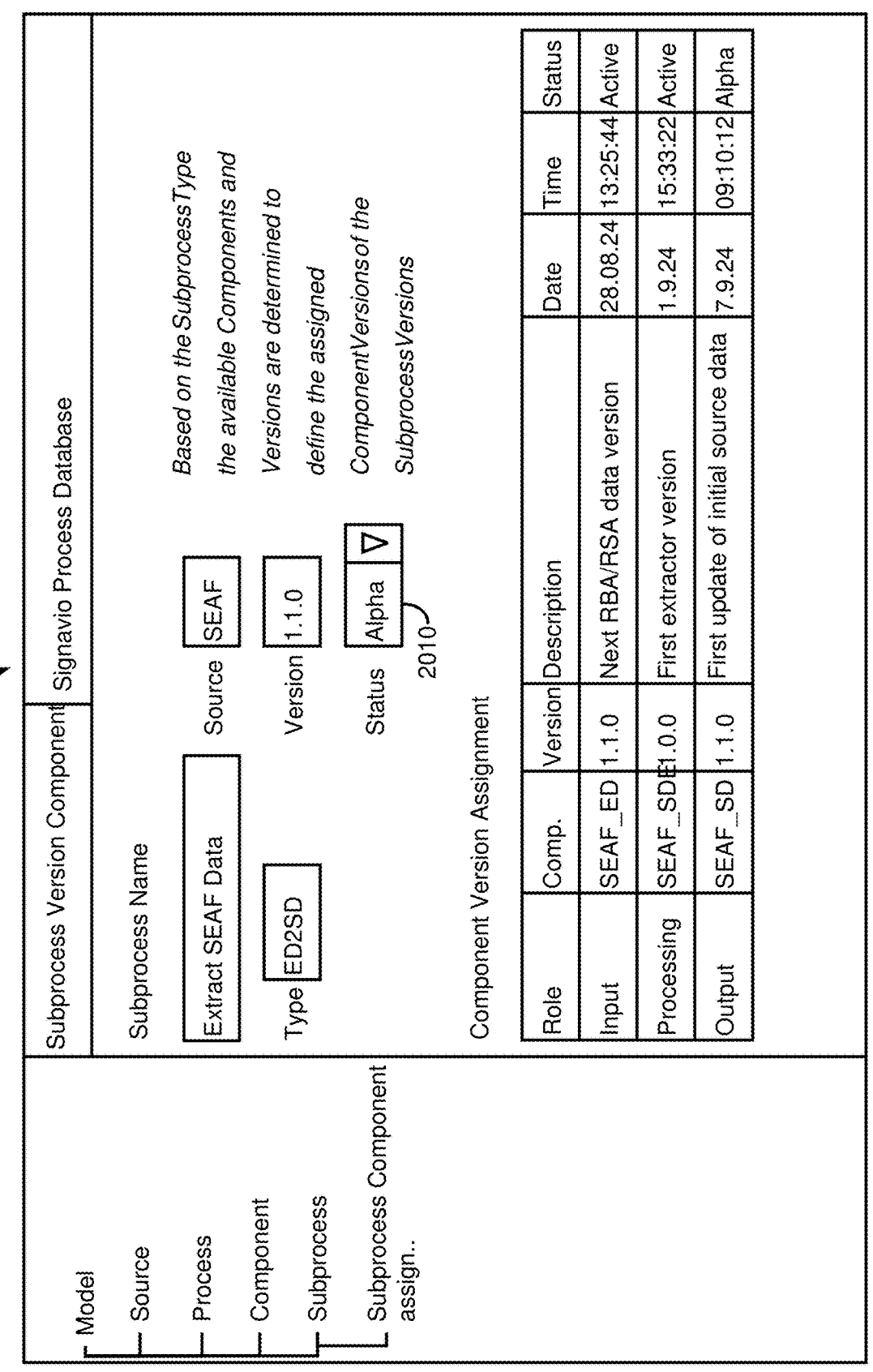
FIG. 20 is an example user interface for managing assignments of versions of components to a subprocess version.

FIG. 20 provides a user interface 2000 that can be used to view components associated with a subprocess, including versions of such components. In a particular implementation, the user interface 2000 can be displayed in response to a selecting user interface element 1920 of the user interface 1900 of FIG. 19. The user interface 2000 provides information about the subprocess itself, such as its name, the source it is used with, its type, and its version. The user interface 2000 also provides a status for the subprocess version, and the status can be altered, such as to activate an alpha version of a subprocess, using user interface element 2010.

The user interface 2000 also provides information regarding components used in the subprocess. The user interface 2000 provides a role of each component (such as input, output, or processing), an identifier of the component, the version of the component that is used with the particular version of the subprocess shown in the user interface, a description of the component, a date and time associated with the component, such as when it was created or activated, and a status. Alternatively, the date and time may indicate when a particular status of the component was set.

Figure 21:
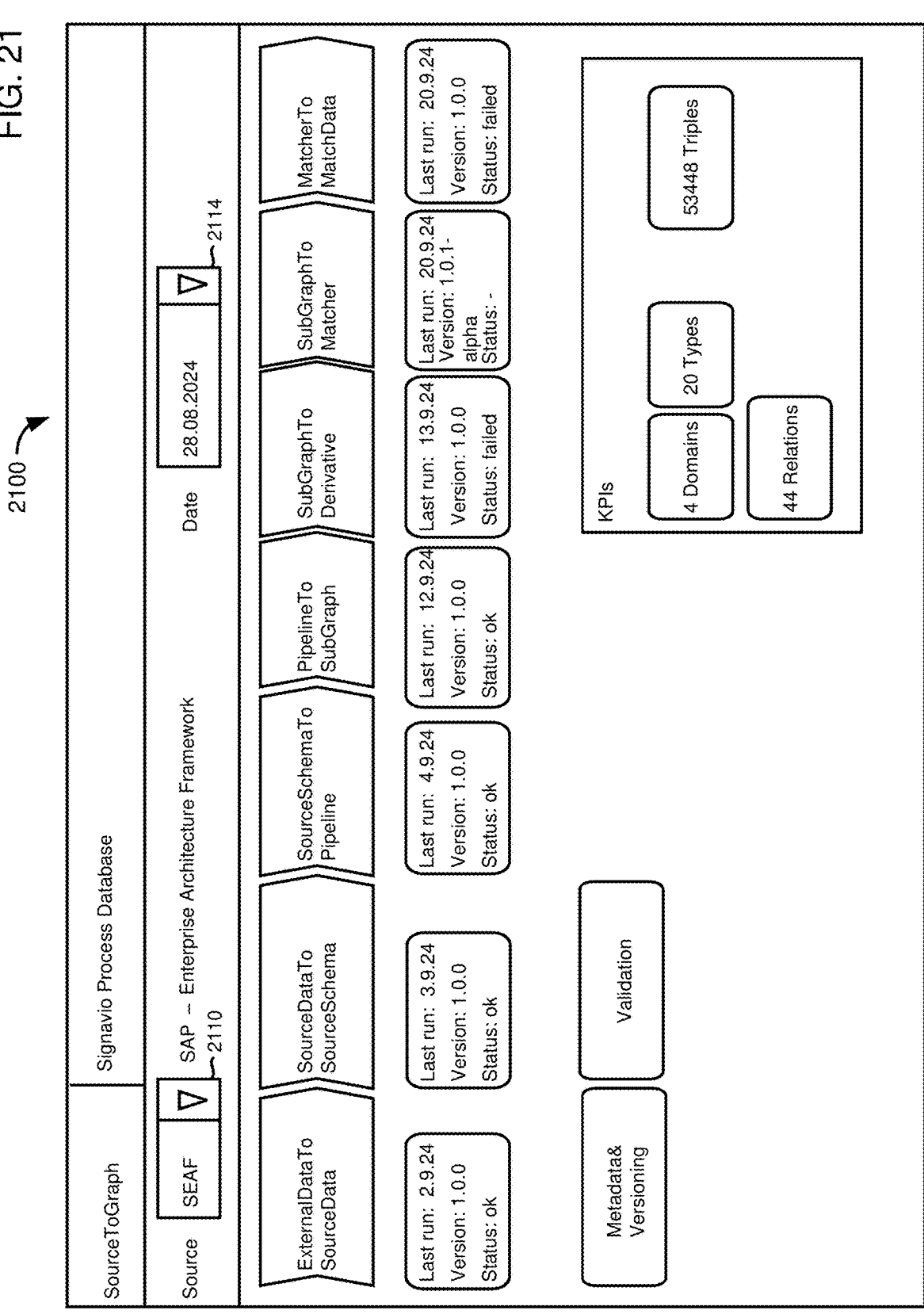
FIG. 21 is an example user interface for reviewing results of process execution, include results of subprocesses of the process.

FIG. 21 provides a user interface 2100 that displays details of processes, including subprocess execution status.

A user can select a date for which process details are desired. The user can also select a particular source for which the process is defined.

The user interface 2100 displays the sequence of subprocesses of the process, and provides execution details of the subprocesses, such as when the subprocess was last execution, what version of the subprocess was executed, and a status of the execution, such as whether the subprocess completed, failed, or is still in progress or pending, such as because approval is needed to execute a new version of the subprocess.

The user interface 2100 provides user interface elements 2110, 2114 which can be used, respectively, to navigate to a user interface displaying metadata and versioning information for the process, or to a validation user interface, such as validating output of one subprocess for use in a subsequent subprocess, or validating a new version of a subprocess or subprocess component prior to activation.

Performance metrics can also be provided, such as the number of domains represented in the results, the number of types (or classes) in a subgraph produced by the process, the number of relations in the subgraph, and a total number of triples used to define the subgraph.

Example 10)—Examples Operations

FIG. 22 illustrates a process 2200 for managing subprocess versions and associated updates within a computing system. At 2210, a definition of a first version of a subprocess is received. The first version of the subprocess includes one or more components, where the one or more components are associated with a respective executable implementation. Processing data using the first version of the subprocess to produce first results occurs at 2214.

At 2218, a change to the definition of the first version of the subprocess is received to provide a second version of the subprocess. The change involves either a version of a component of the first version of the subprocess or the components themselves, or the sequence in which the components are called, of the first version of the subprocess. An identifier of the second version of the subprocess is generated at 2222.

At 2226, an event is generated indicating that the first version of the subprocess has been updated. At 2230, one or more actions are performed in response to the event. These actions include triggering a request to validate the second version of the subprocess or the second results, reprocessing the data using the second version of the subprocess, or adding the identifier of the second version of the subprocess to a provenance chain. The provenance chain includes version identifiers for multiple subprocesses of a process, where the multiple subprocesses include the process.

Example 11)—Additional Examples

Example 1 is a computing system that includes at least one hardware processor, at least one memory coupled to the at least one hardware processor, and one or more computer-readable storage media. The computer-readable storage media include computer-executable instructions that, when executed, cause the computing system to perform operations. The operations include receiving a definition of a first version of a subprocess. The first version of the subprocess includes one or more components, where the one or more components are associated with a respective executable implementation. Data is processed using the first version of the subprocess to produce first results.

A change to the definition of the first version of the subprocess is received to provide a second version of the subprocess. The change is either a change to a version of a component of the first version of the subprocess or a change to the components, or the sequence in which components are called, of the first version of the subprocess. An identifier of the second version of the subprocess is generated. An event is generated, indicating that the first version of the subprocess has been updated.

In response to generating the event, one of the following is performed: a request to validate the second version of the subprocess or the second results is triggered; data is reprocessed using the second version of the subprocess; or the identifier of the second version of the subprocess is added to a provenance chain that includes version identifiers for multiple subprocesses of a process, where the multiple subprocesses include the process.

Example 2 is the computing system of Example 1, where components of the one or more components are associated with a version identifier. The operations further include receiving a change to the implementation of the component. In response to receiving the change to the implementation of the component, the version identifier of the component is updated.

In response to updating the version identifier of the component, an event is generated, indicating that the version identifier of the component has been updated. The event results in the subprocess receiving the change to its definition.

Example 3 is the computing system of Example 1 or Example 2, where the component is used in multiple subprocesses, and the event is sent to the respective subprocesses of the multiple subprocesses.

Example 4 is the computing system of Example 3, where at least one subprocess of the multiple subprocesses is used in multiple different processes.

Example 5 is the computing system of any of Examples 1-4, where the component is a data artifact, and the change is to a definition of the data artifact.

Example 6 is the computing system of any of Examples 1-4, where the component is an algorithm that operates on the data, and the change is to processing defined in the algorithm.

Example 7 is the computing system of any of Examples 1-6, where the subprocess is part of a process for ingesting data from a source into the first graph data structure.

Example 8 is the computing system of any of Examples 1-7, where the subprocess associates data from the source with a source schema defined for the source.

Example 9 is the computing system of any of Examples 1-8. The operations further include storing data from the source, having associations with the source schema, in a second graph data structure.

Example 10 is the computing system of Example 9. The operations further include generating relationships between data in the second graph data structure and corresponding elements of the first graph data structure.

Example 11 is the computing system of any of Examples 1-10. The operations further include, in response to triggering a request to validate the second version of the subprocess or the second results, receiving user input through a user interface validating the second version of the subprocess or the second results.

Example 12 is the computing system of any of Examples 1-11, where reprocessing the data using the second version of the subprocess is performed in response to the user input.

Example 13 is the computing system of any of Examples 1-12. The operations further include creating a process, assigning a plurality of subprocesses to the process, where the plurality of subprocesses include the subprocess, and defining a sequence between subprocesses of the plurality of subprocesses. Defining the sequence includes assigning an output of a first subprocess of the plurality of subprocesses as input to a second subprocess of the plurality of subprocesses.

Example 14 is the computing system of Example 13. The operations further include, for respective subprocesses of the plurality of subprocesses, assigning one or more components to the respective subprocess.

Example 15 is the computing system of Example 13 or Example 14, where subprocesses of the plurality of subprocesses and components of the one or more components are used with multiple sources, where an implementation of a component of the one or more components differs between at least two sources of the multiple sources.

Example 16 is the computing system of any of Examples 1-15. The operations further include ingesting data from a first source having a first source schema using the subprocess and matching data from the first source in the first source schema to elements of a second source schema of a second source, where the second source schema is different from the first source schema.

Example 17 is the computing system of any of Examples 1-15. The operations further include ingesting data from a first source having a first source schema using the subprocess, ingesting data from a second source having a second source schema, where the second source schema is the same as or different from the first source schema, and where the second source is either the same as or different from the first source, and matching data from the first source in the first source schema to data from the second source in the second source schema.

Example 18 is the computing system of Example 17, where the second source is different from the first source, and the second source schema is different from the first source schema.

Example 19 is a method implemented in a computing system that includes at least one hardware processor and at least one memory coupled to the at least one hardware processor. The method includes receiving a definition of a first version of a subprocess, where the first version of the subprocess includes one or more components, and the one or more components are associated with a respective executable implementation. Data is processed using the first version of the subprocess to produce first results.

A change to the definition of the first version of the subprocess is received to provide a second version of the subprocess. The change is a change to a version of a component of the first version of the subprocess or a change to the components, or the sequence in which components are called, of the first version of the subprocess. An identifier of the second version of the subprocess is generated. An event is generated, indicating that the first version of the subprocess has been updated.

In response to generating the event, one or more of the following is performed: a request to validate the second version of the subprocess or the second results is triggered; the data is reprocessed using the second version of the subprocess; or the identifier of the second version of the subprocess is added to a provenance chain that includes version identifiers for multiple subprocesses of a process, where the multiple subprocesses include the process.

Example 20 is one or more non-transitory computer-readable storage media. The storage media include computer-executable instructions that, when executed by a computing system comprising at least one hardware processor and at least one memory coupled to the at least one hardware processor, cause the computing system to perform operations.

The operations include receiving a definition of a first version of a subprocess, where the first version of the subprocess includes one or more components, and the one or more components are associated with a respective executable implementation. Data is processed using the first version of the subprocess to produce first results.

A change to the definition of the first version of the subprocess is received to provide a second version of the subprocess. The change is a change to a version of a component of the first version of the subprocess or a change to the components, or the sequence in which components are called, of the first version of the subprocess. An identifier of the second version of the subprocess is generated. An event is generated, indicating that the first version of the subprocess has been updated.

In response to generating the event, one or more of the following is performed: a request to validate the second version of the subprocess or the second results is triggered; the data is reprocessed using the second version of the subprocess; or the identifier of the second version of the subprocess is added to a provenance chain that includes version identifiers for multiple subprocesses of a process, where the multiple subprocesses include the process.

Example 12—Computing Systems

Figure 23:
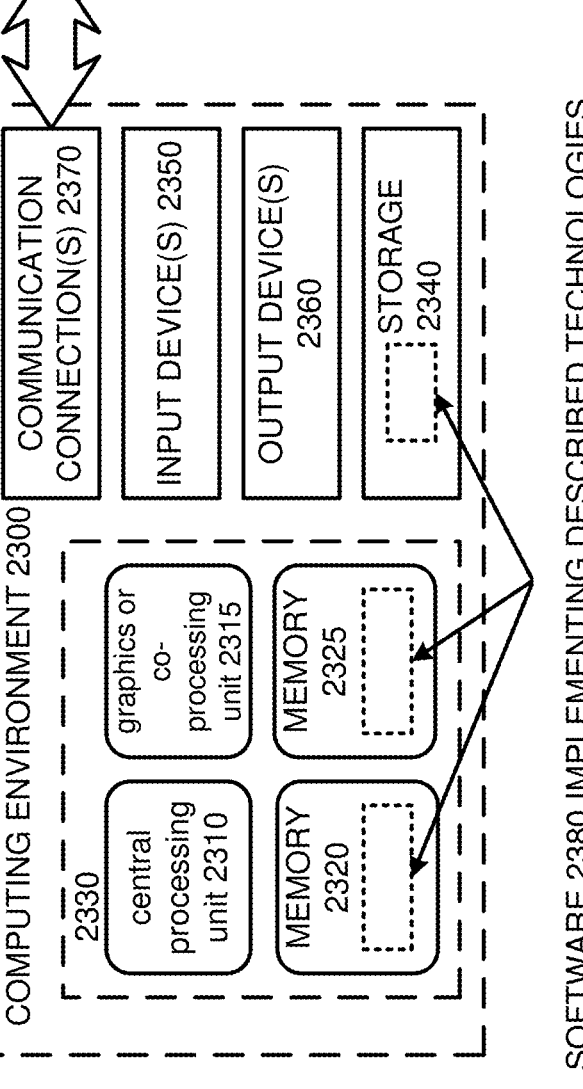
FIG. 23 is a diagram of an example computing environment in which disclosed techniques can be implemented.

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions, such as for implementing technologies described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way, and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 24:
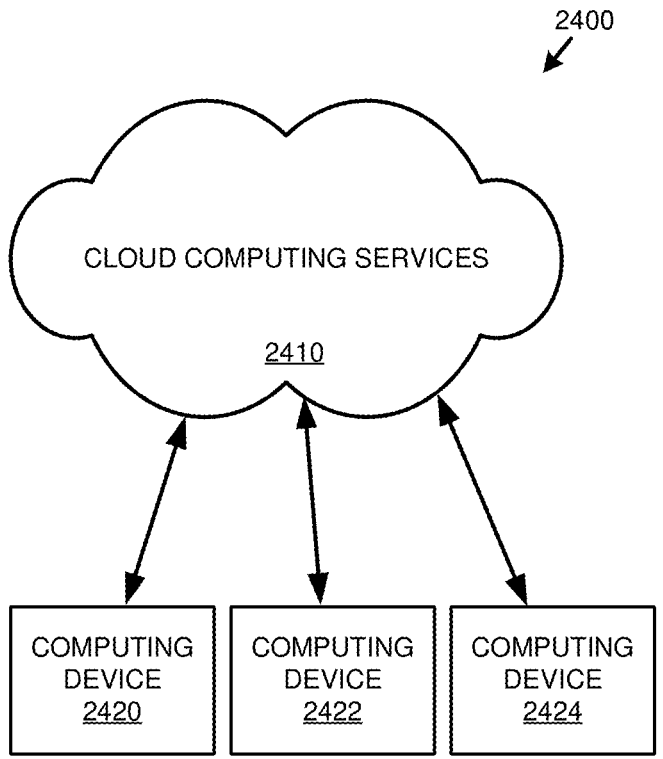
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media comprising computer-executable instructions that, when executed, cause the computing system to perform operations comprising:
receiving a definition of a first version of a subprocess, the first version of the subprocess comprising one or more components, the one or more components being associated with a respective executable implementation;

processing data using the first version of the subprocess to produce first results;
receiving a change to the definition of the first version of the subprocess to provide a second version of the subprocess, the change being to a version of a component of the first version of the subprocess or a change to the components, or sequence in which components are called, of the first version of the subprocess;
generating an identifier of the second version of the subprocess;
generating an event indicating the first version of the subprocess has been updated; and
in response to generating the event, (1) triggering a request to validate the second version of the subprocess or validate ed results generated by the second version of the subprocess, or (2) reprocessing the data using the second version of the subprocess, or (3) adding the identifier of the second version of the subprocess to a provenance chain that includes version identifiers for multiple subprocesses of a process, the multiple subprocesses comprising the process.

2. The computing system of claim 1, wherein components of the one or more components are associated with a version identifier, the operations further comprising:
receiving a change to the implementation of the component;
in response to receiving the change to the implementation of the component, updating the version identifier of the component;
in response to updating the version identifier of the component, generating an event indicating that the version of the identifier of the component has been updated, the event resulting in the subprocess receiving the change to its definition.

3. The computing system of claim 2, wherein the component is used in multiple subprocesses and the event is sent to the respective subprocesses of the multiple subprocesses.

4. The computing system of claim 3, wherein at least one subprocess of the multiple subprocesses is used in multiple different processes.

5. The computing system of claim 2, wherein the component is a data artifact, and the change is to a definition of the data artifact.

6. The computing system of claim 2, wherein the component is an algorithm that operates on the data, and the change is to processing defined in the algorithm.

7. The computing system of claim 1, wherein the subprocess is part of a process for ingesting data from a source into the first graph data structure.

8. The computing system of claim 7, wherein the subprocess associates data from the source with a source schema defined for the source.

9. The computing system of claim 8, the operations further comprising:
storing data from the source, having associations with the source schema, in a second graph data structure.

10. The computing system of claim 9, the operations further comprising:
generating relationships between data in the second graph data structure and corresponding elements of the first graph data structure.

11. The computing system of claim 1, the operations further comprising:
in response to triggering a request to validate the second version of the subprocess or the second results, receiving user input through a user interface validating the second version of the subprocess or the second results.

12. The computing system of claim 11, wherein the reprocessing the data using the second version of the subprocess is performed in response to the user input.

13. The computing system of claim 1, the operations further comprising:

creating a process;

assigning a plurality of subprocesses to the process, the plurality of subprocesses comprising the subprocess;

defining a sequence between subprocesses of the plurality of subprocesses, the defining a sequence comprising assigning an output of a first subprocess of the plurality of subprocesses as input to a second process of the plurality of subprocesses.

14. The computing system of claim 13, the operations further comprising:

for respective processes of the plurality of subprocesses, assigning one or more components to the respective subprocess.

15. The computing system of claim 13, wherein subprocesses of the one or more subprocess and components of the one or more components are used with multiple sources, where an implementation of a component of the one of more components differs between at least two sources of the multiple sources.

16. The computing system of claim 1, the operations further comprising:

ingesting data from a first source having a first source schema using the subprocess; and matching data from the first source in the first source schema to elements of a second source schema of a second source, wherein the second source schema is different from the first source schema.

17. The computing system of claim 1, the operations further comprising:

ingesting data from a first source having a first source schema using the subprocess;

ingesting data from a second source having a second sources schema, the second source schema being the same as or different from the first source schema, and wherein the second source is either the same as or different from the first source; and matching data from the first source in the first source schema to data from the second source in the second source schema.

18. The computing system of claim 17, wherein the second source is different from the first source and the second source schema is different from the first source schema.

19. A method, implemented in a computing system comprising at least one hardware processor and at least one memory coupled to the at least one hardware processor, the method comprising:

receiving a definition of a first version of a subprocess, the first version of the subprocess comprising one or more components, the one or more components being associated with a respective executable implementation;

processing data using the first version of the subprocess to produce first results;

receiving a change to the definition of the first version of the subprocess to provide a second version of the subprocess, the change being to a version of a component of the first version of the subprocess or a change to the components, or sequence in which components are called, of the first version of the subprocess;

generating an identifier of the second version of the subprocess;

generating an event indicating the first version of the subprocess has been updated; and in response to generating the event, (1) triggering a request to validate the second version of the subprocess or validate ed results generated by the second version of the subprocess, or (2) reprocessing the data using the second version of the subprocess, or (3) adding the identifier of the second version of the subprocess to a provenance chain that includes version identifiers for multiple subprocesses of a process, the multiple subprocesses comprising the process.

20. One or more non-transitory computer-readable storage media comprising:

computer-executable instructions that, when executed by a computing system comprising at least one hardware processor and at least one memory coupled to the at least one hardware processor, cause the computing system to receive a definition of a first version of a subprocess, the first version of the subprocess comprising one or more components, the one or more components being associated with a respective executable implementation;

computer-executable instructions that, when executed by the computing system, cause the computing system to process data using the first version of the subprocess to produce first results;

computer-executable instructions that, when executed by the computing system, cause the computing system to receive a change to the definition of the first version of the subprocess to provide a second version of the subprocess, the change being to a version of a component of the first version of the subprocess or a change to the components, or sequence in which components are called, of the first version of the subprocess;

computer-executable instructions that, when executed by the computing system, cause the computing system to generate an identifier of the second version of the subprocess;

computer-executable instructions that, when executed by the computing system, cause the computing system to generate an event indicating the first version of the subprocess has been updated; and computer-executable instructions that, when executed by the computing system, cause the computing system to, in response to generating the event, (1) trigger a request to validate the second version of the subprocess or validate ed results generated by the second version of the subprocess, or (2) reprocess the data using the second version of the subprocess, or (3) add the identifier of the second version of the subprocess to a provenance chain that includes version identifiers for multiple subprocesses of a process, the multiple subprocesses comprising the process.

* * * * *